(12) United States Patent
Luo et al.

(10) Patent No.: US 7,535,937 B2
(45) Date of Patent: May 19, 2009

(54) MONOLITHIC MICROCHIP LASER WITH INTRACAVITY BEAM COMBINING AND SUM FREQUENCY OR DIFFERENCE FREQUENCY MIXING

(75) Inventors: Ningyi Luo, Fremont, CA (US); Sheng-Bai Zhu, Fremont, CA (US); Shaoping Lu, Palo Alto, CA (US)

(73) Assignee: Pavilion Integration Corporation, San Jose, CA (US)

( * ) Notice: Subject to any disclaimer, the term of this patent is extended or adjusted under 35 U.S.C. 154(b) by 212 days.

(21) Appl. No.: 11/378,552

(22) Filed: Mar. 18, 2006

(65) Prior Publication Data

US 2006/0209912 A1 Sep. 21, 2006

Related U.S. Application Data

(60) Provisional application No. 60/663,503, filed on Mar. 18, 2005, provisional application No. 60/708,596, filed on Aug. 15, 2005.

(51) Int. Cl.
*H01S 3/10* (2006.01)
*H01S 3/08* (2006.01)

(52) U.S. Cl. .......................... 372/21; 372/105
(58) Field of Classification Search ............ 372/21, 372/105
See application file for complete search history.

(56) References Cited

U.S. PATENT DOCUMENTS

| | | | |
|---|---|---|---|
| 5,091,912 A * | 2/1992 | Bretenaker et al. ............ 372/23 |
| 5,333,142 A | 7/1994 | Scheps | |
| 5,345,457 A | 9/1994 | Zenzie et al. | |
| 5,651,019 A | 7/1997 | Goldberg et al. | |
| 5,737,347 A | 4/1998 | Scheps et al. | |
| 5,802,086 A | 9/1998 | Hargis et al. | |
| 5,832,010 A * | 11/1998 | Fulbert et al. ................. 372/22 |
| 6,141,369 A | 10/2000 | Seelert et al. | |
| 6,198,756 B1 | 3/2001 | Caprara et al. | |
| 6,219,363 B1 | 4/2001 | Fix et al. | |
| 6,256,327 B1 | 7/2001 | Goldberg | |
| 6,301,276 B1 | 10/2001 | Kaneda | |
| 6,362,919 B1 * | 3/2002 | Flanders ..................... 359/497 |
| 6,373,868 B1 | 4/2002 | Zhang | |
| 6,567,434 B2 | 5/2003 | Spinelli et al. | |
| 6,714,569 B2 | 3/2004 | Zhu et al. | |
| 6,724,787 B2 | 4/2004 | Masterson et al. | |
| 6,807,210 B2 | 10/2004 | Iwai et al. | |
| 6,816,519 B2 * | 11/2004 | Momiuchi et al. ............ 372/21 |
| 6,870,862 B2 | 3/2005 | Momiuchi et al. | |
| 7,330,493 B2 * | 2/2008 | Luo et al. ................... 372/50.1 |
| 2001/0005390 A1 * | 6/2001 | Hirata et al. ............. 372/38.02 |
| 2004/0095982 A1 | 5/2004 | Momiuchi et al. | |

(Continued)

*Primary Examiner*—Minsun Harvey
*Assistant Examiner*—Joshua King

(57) ABSTRACT

A method for producing low-noise laser output at various wavelengths and/or in various operation modes in a monolithic microchip laser comprises schemes of generating two fundamental beams in separate cavities, precise intracavity beam combination based on the walk-off effect in birefringent crystal, and wavelength conversion in nonlinear optical crystals. The fundamental beams are produced from light sources selected upon the desired wavelengths, polarizations, and other features related to the laser output. Low-noise laser devices operated in SLM or with spectra of flat-top or desired bandwidths are constructed according to the method. High-volume fabrication is feasible. Apparatus of compact size and efficient frequency conversion is demonstrated with various configurations including those for generating low-noise 491 nm laser, as a replacement of Argon ion laser.

15 Claims, 25 Drawing Sheets

U.S. PATENT DOCUMENTS

2005/0169326 A1  8/2005  Jacob et al.
2005/0174639 A1* 8/2005  Zalevsky et al. ............ 359/484
2005/0174640 A1  8/2005  Chen et al.

* cited by examiner

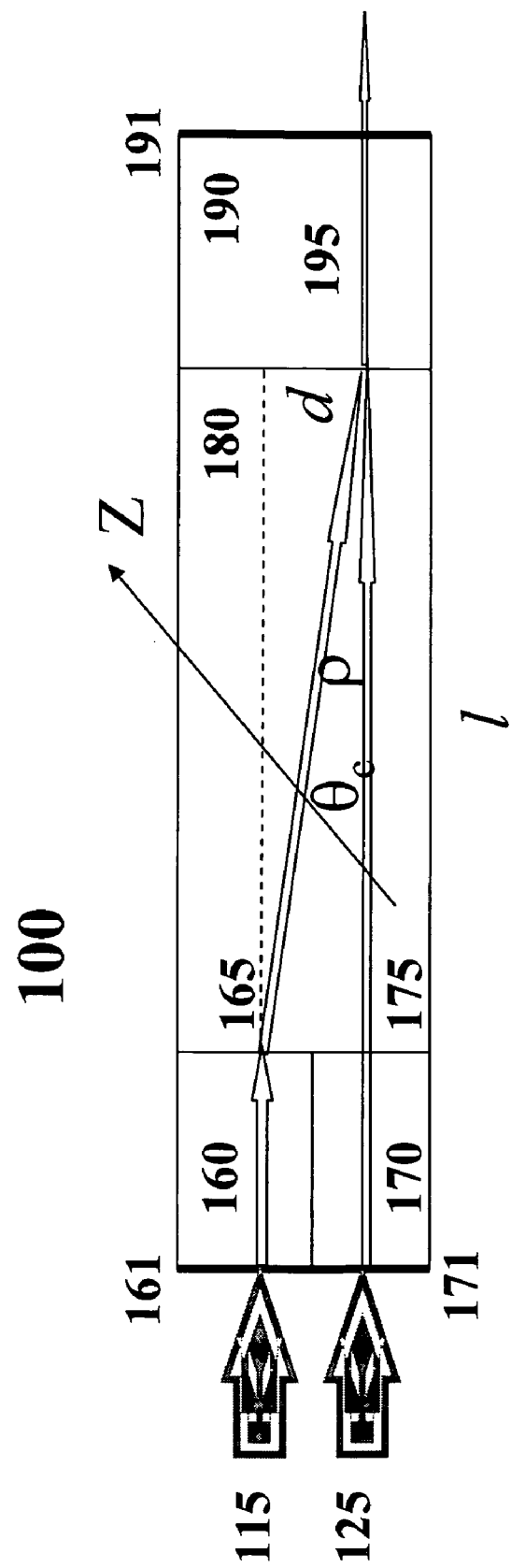

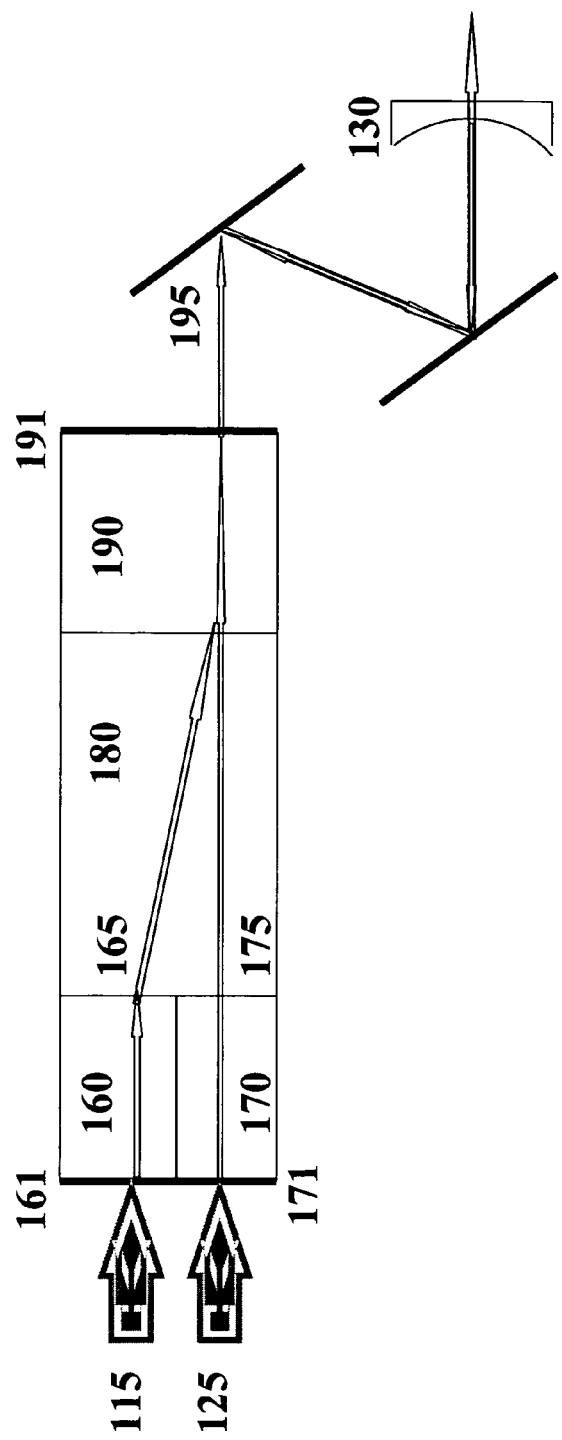

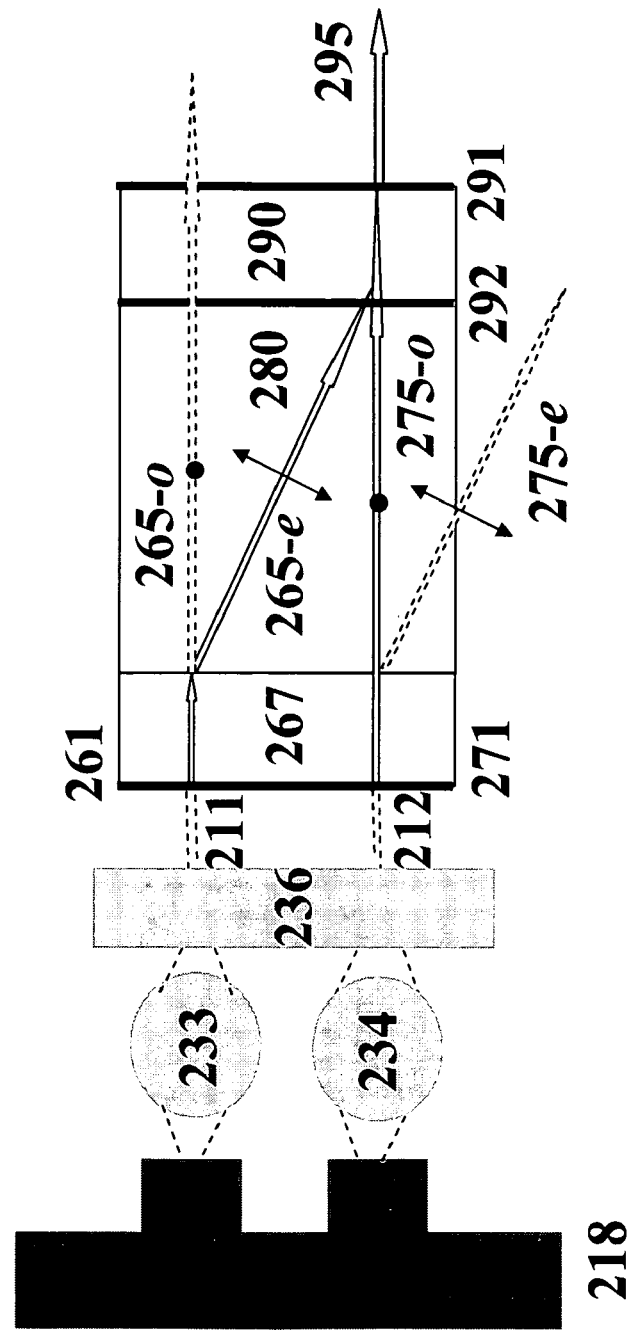

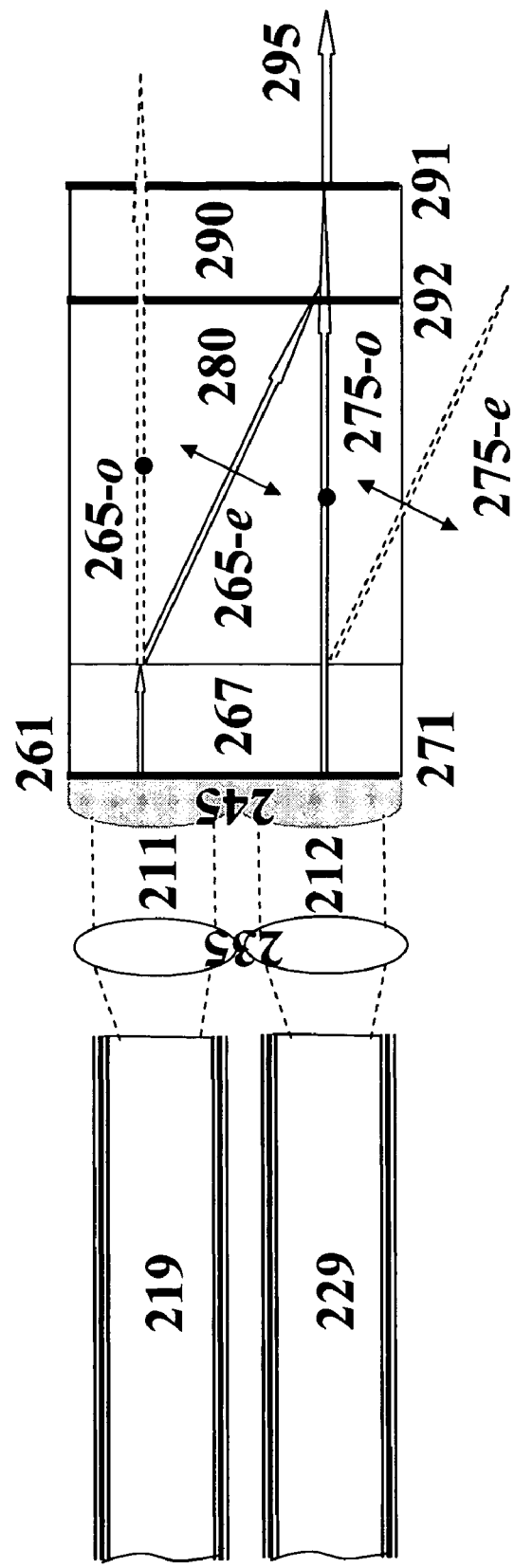

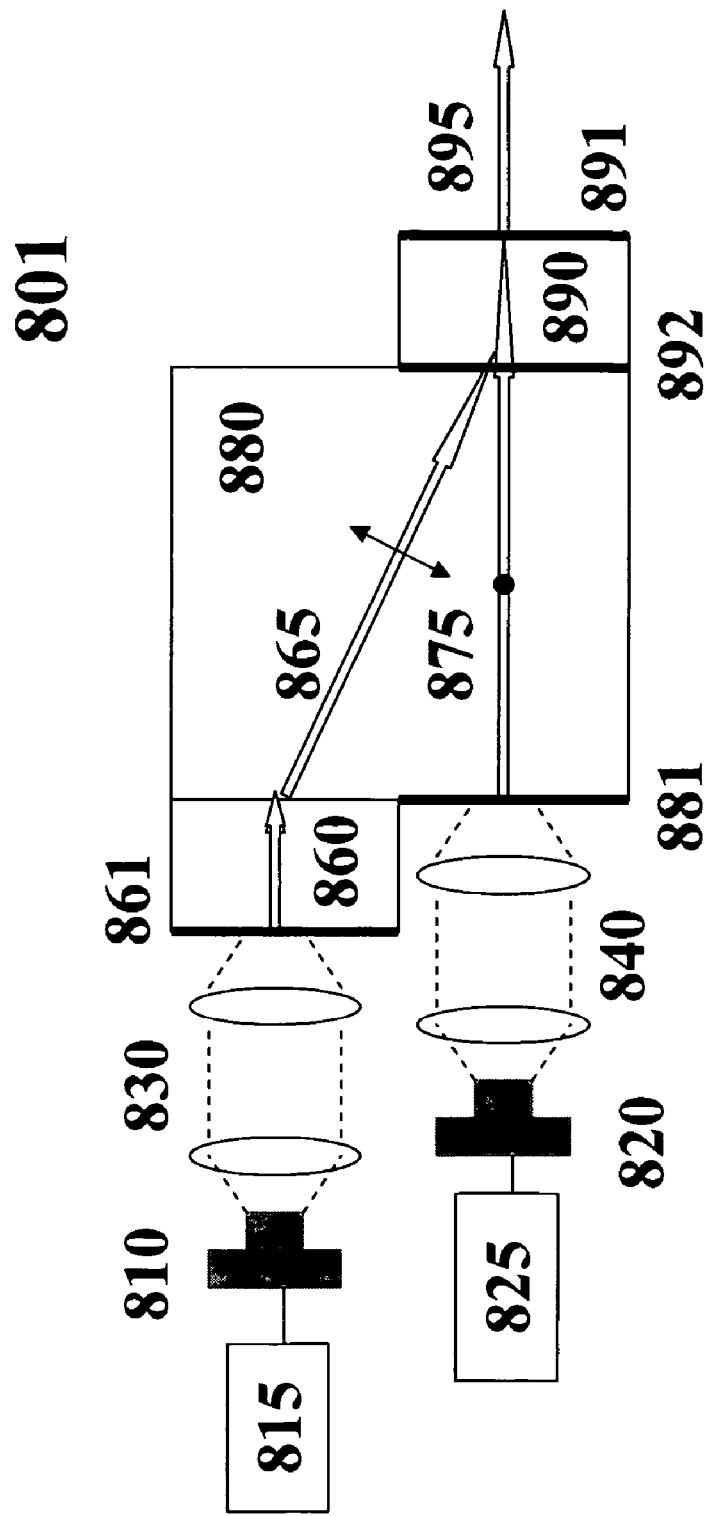

MONOLITHIC MICROCHIP LASER WITH INTRACAVITY BEAM COMBINING AND SUM FREQUENCY OR DIFFERENCE FREQUENCY MIXING

CROSS REFERENCE TO RELATED APPLICATION

This application claims the benefit of U.S. Provisional Application No. 60/663,503, filed Mar. 18, 2005, and U.S. Provisional Application No. 60/708,596, filed Aug. 15, 2005, which are hereby incorporated by reference in its entirety.

FIELD OF THE INVENTION

This invention relates generally to solid-state lasers, and in particular to monolithic microchip lasers using intracavity beam combining and sum frequency mixing (SFM) or difference frequency mixing (DFM) to generate a variety of lasing wavelengths including 457 nm, 473 nm, 491 nm, 505 nm, 532 nm, and 593 nm with low optical noise.

BACKGROUND OF THE INVENTION

Continuous-wave (CW) monochromatic lights at a number of wavelengths such as blue ($\lambda$~490 nm) and orange ($\lambda$~590 nm), which are useful for scientific research and medical or industry applications, cannot be directly generated from a laser diode or diode-pumped solid-state (DPSS) laser. As a consequence, traditional air-cooled Argon ion lasers, HeNe lasers, and dye lasers, though bulky and inefficient, have been the workhorse for the past years and are still playing important roles in these spectral ranges.

It is therefore highly desirable to develop compact and efficient solid-state lasers as their replacement.

In the past decade, a number of efforts have been devoted to the development of blue, green, or orange lasers by the use of indirect methods. The most commonly used method is based on frequency doubling technology. When a light of appropriate wavelength, e.g. 980 nm emanating from a laser diode, passes through a nonlinear crystal or waveguide, its second harmonic is generated due to the light-material interaction, resulting in doubled frequency, i.e., 490 nm. The frequency doubling can be realized through a direct single pass or through external cavity resonance with periodically poled nonlinear crystals or nonlinear waveguides. Lasers based on such approaches can be made extremely compact and highly efficient. In fact, some commercially available products have been developed to replace the legacy ion lasers. However, these lasers are generally expensive and may have long-term reliability issues, especially when costly waveguide materials are employed.

An alternative technology for wavelength conversion is based on Sum Frequency Mixing (SFM). As an example, in U.S. Pat. No. 5,345,457, Zenzie and Moulton demonstrated a dual-wavelength laser system with intracavity sum-frequency mixing. A Brewster prism assembly or a dichroic mirror was employed for combining the two input beams. As another example, in U.S. Pat. No. 5,802,086, Hargis and Pessot have investigated monolithic DPSS microlasers based on intracavity optical frequency mixing. However, these systems generally have shortcomings of complicated structure, high loss, and unstable operation. In addition, the achievable wavelengths in dual-wavelength lasers are limited to transitions with similar stimulated emission cross sections. For example, lasers at the orange wavelengths near 590 nm can be generated in Neodymium ion doped crystals by intracavity SFM because the ratio of the stimulated emission cross-sections for transition $^4F_{3/2} \rightarrow {}^4I_{11/2}$ and transition $^4F_{3/2} \rightarrow {}^4I_{13/2}$ is nearly one. In fact, both CW and Q-switched lasers at 593 nm through intracavity sum frequency mixing of 1064 nm and 1342 nm have been demonstrated by Chen et al. in publications appeared in Optics Letters Vol. 27, No. 6 and No. 20. More recently, Momiuchi et al. in U.S. Pat. No. 6,816,519 described generation of 593 nm laser through SFM of 1064 nm and 1342 nm. In their devices, the two fundamental lights were generated in separated resonant cavities with separated pumping sources and combined in a common nonlinear optical medium for wavelength conversion. The drawbacks of these devices include intracavity loss due to insertion of wavelength separating plates and stringent coating requirements.

In principle, laser output at blue spectral region near 488 nm to 492 nm can also be obtained from SFM between, e.g., well established 1064 nm and 914 nm lines. These lines can be generated from neodymium doped lasers such as Nd:YVO$_4$ and Nd:GdVO$_4$. This scheme, however, cannot be simply realized in a dual-wavelength laser because the transition $^4F_{3/2} \rightarrow {}^4I_{9/2}$ (914 nm) is about one order of magnitude weaker than the transition $^4F_{3/2} \rightarrow {}^4I_{11/2}$ (1064 nm). The former corresponds to a quasi-three level system, in which the lower energy level coincides with the ground electronic state. It is difficult to create and maintain population inversion in such a system when a strong transition, e.g. $^4F_{3/2} \rightarrow {}^4I_{11/2}$, is present in the same medium. One way to resolve this problem is to use a separate high power single mode or multimode semiconductor laser as the source of 914 nm line. An example of such systems was demonstrated by Johansson et al. in Optics Express Vol. 13, No. 7. Another way to reduce the gain competition effect is adjustment of mirror reflectivities and/or alignments. Dual-wavelength lasers based on this scheme to obtain CW blue radiations were recently reported by Herault et al. in Optics Express Vol. 13, No. 15. However, their architectures are complicated, requiring many optical components, and the efficiency is low.

Other challenges for intracavity frequency doubled lasers or intracavity SFM lasers include reduction of optical noises such as amplitude fluctuations in the green output caused by nonlinear interactions of the longitudinal modes. Three solutions to the "green problem" have been investigated in the prior art: (1) lasers operated with a great many longitudinal modes (~100) to average out intensity fluctuations in time domain; (2) single longitudinal mode (SLM) lasers to eliminate longitudinal mode coupling; (3) lasers operated at few modes with decoupled eigenstates of polarization. All of these approaches require the insertion of mode-selection elements and/or temperature stabilization or a long resonator, introducing additional complexity and cost.

It would be an advantage and, in fact, an object of the present invention as well, to provide a method whereby a variety of wavelengths that are not available from a single laser diode or a DPSS laser or an ultra-compact laser based on the intracavity SFM or second-harmonic generation (SHG) schemes described in the prior art can be obtained at low optical noise.

SUMMARY OF THE INVENTION

It is therefore an object of the present invention to provide a method and associated apparatus and device for enabling low-noise monolithic microchip lasers, wherein intracavity beam combining and sum frequency mixing (SFM) or difference frequency mixing (DFM) are used for generation of various lasing wavelengths including those not available from the prior art.

It is another object of the present invention to provide a method and associated apparatus and device for enabling low-noise multimode or single longitudinal mode (SLM) laser output or laser output with a desired bandwidth from a monolithic microchip laser based on the intracavity beam combining and frequency conversion.

It is another object of the present invention to provide an all-solid state low optical noise blue laser in the 491 nm spectral region, as a replacement of popularly used air-cooled Argon ion laser.

It is another object of the present invention to provide an all-solid state low optical noise orange laser in the 594 nm spectral region, as a replacement of popularly used He—Ne and dye lasers.

It is yet another object of the present invention to provide a number of alternative configurations, highly flexible in accordance with specific applications, for further improving the compactness and/or efficiency of the monolithic microchip laser based on the intracavity beam combining and frequency conversion.

According to this invention, two fundamental laser beams are generated from two independent laser cavities for elimination of the green problem. These two fundamental laser beams are linearly polarized with mutually orthogonal polarizations and are combined based on the Poynting vector walk-off effect in a birefringent crystal to generate the desired wavelength by means of intracavity frequency mixing in a nonlinear optical (NLO) crystal. Cavity parameters can be separately adjusted to optimize the laser performance.

According to this invention and depending on specific needs, the two fundamental laser beams can be generated at the same side of the microchip laser or at the two opposite sides of the microchip laser and enter the NLO crystal from the two opposite surfaces. With optimized configuration, the laser compactness and/or efficiency can be further improved.

According to this invention, a concave output coupler can be used to form a half-confocal cavity. This type of monolithic or hybrid-monolithic structure is designed in order to improve beam collimation and to compensate heat-induced distortion of the focal length in high power operation. High degree of beam collimation is desired for efficient and low-noise SFM.

According to this invention, the fundamental laser beams can be generated from gain media characteristic of polarization dependent emission or of polarization independent emission. The two fundamental wavelengths can be identical or different. With these flexibilities, the selectable materials and wavelengths are greatly extended.

According to this invention, one or both of the fundamental laser beams can be generated from laser diodes and/or DPSS lasers and/or optical parametric oscillators (OPO) and/or other sources that preferably emit linearly polarized lights to form monolithic or hybrid systems. Features of the specially designed fundamental beams such as wavelength coverage, radio frequency (RF) modulation, direct modulation, and broadband spectrum can be carried into the mixed output.

According to this invention, the walk-off effect can be applied to polarization discrimination. In particular, each laser cavity supports a single polarization of predetermined direction. Inclusion of intracavity polarizers is therefore not necessary. With polarization discrimination, lasing at unwanted polarizations can be suppressed.

According to this invention, the walk-off effect can be employed for splitting one pump beam into two components with mutually orthogonal polarizations. This enables simultaneous activation of two independent gain media or of two narrowly-spaced active regions in an isotropic medium or a gain medium characteristic of polarization-dependent lasing transition from a single pump source in an extremely compact and cost-effective manner.

According to this invention, a single gain medium or two independent gain media can be pumped by a dual-emitter with narrow space. With this configuration, the monolithic microchip laser can be made extremely compact and efficient. Since, at certain walk-off angle, the required length of the birefringent crystal is proportional to the distance between the two emitters, this configuration allows of a short walk-off crystal, which reduces the requirement for beam collimation. In addition, the structure can be designed for wafer-level fabrication and tests, enabling high-volume manufacturing.

According to this invention, one or more optical element(s) can be attached, in physical contact or not, to one or each gain medium for specific applications. These optical elements can be wavelength selectors for SLM or tunable laser operation or gain compensators for broadband and/or multimode laser outputs or a set of frequency filters for laser spectra of desired bandwidth. These optical elements can also be electro-optic devices such as Pockels or Kerr cells, or acousto-optic devices or passive devices such as doped crystal characteristic of nonlinear transmission for Q-switch or mode locking.

According to this invention, crystals and optical elements are optically bonded each other to form a monolithic structure of low intracavity loss. Low-cost and high-volume fabrication is therefore feasible.

According to this invention, blue lasing at 491 nm or green lasing at 532 nm or orange lasing at 594 nm can be generated through intracavity SFM of 914 nm and 1064 nm or 1064 nm and 1064 nm or 1064 nm and 1342 nm in a microchip device. These fundamental laser beams are generated from individual laser cavities, combined within the cavities via walk-off in a birefringent crystal such as un-doped $YVO_4$ or $TiO_2$ crystal or the like, and sum frequency mixed in a nonlinear crystal such as KTP or the like. With sophisticated selection of the fundamental wavelengths and nonlinear optical processes, many other useful wavelengths can be achieved.

BRIEF DESCRIPTION OF THE DRAWINGS

This invention may be more completely understood by reading the following detailed description of various embodiments in connection with the accompanying drawings, in which:

FIG. 1A is a schematic illustration of a preferred embodiment of a monolithic microchip laser according to the present invention;

FIG. 1E is a schematic illustration of another alternative embodiment of a microchip laser wherein a folded cavity is employed according to the present invention;

FIG. 2B illustrates an application of the intracavity polarization control scheme to a dual-emitter-pumped monolithic microchip laser, in which the two fundamental laser beams are generated from an isotropic gain medium or from a gain medium characteristic of polarization-dependent radiative transitions;

FIG. 2C illustrates an application of the intracavity polarization control scheme to a fiber-laser-pumped monolithic microchip laser, in which the two fundamental laser beams are generated from an isotropic gain medium or from a gain medium characteristic of polarization-dependent radiative transitions;

FIG. 8A shows a preferred embodiment of the inventive hybrid-monolithic microchip laser, in which one fundamental laser beam is generated from a laser diode;

DETAILED DECRIPTION OF THE INVENTION

Figure 1B:
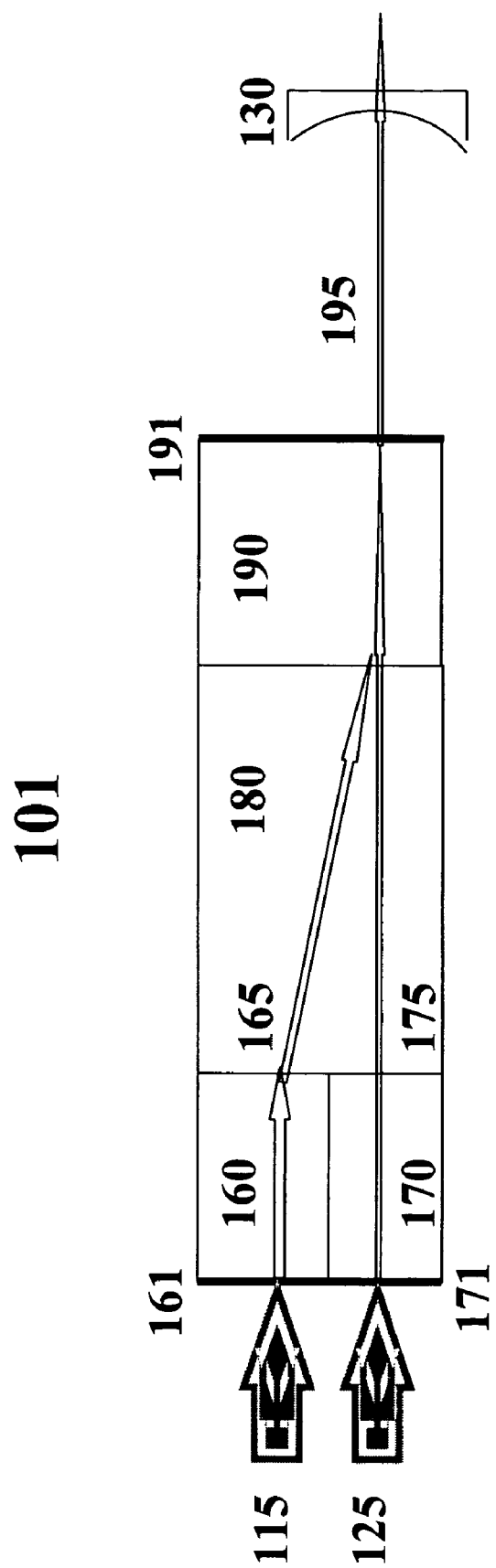
FIG. 1B is a schematic illustration of an alternative embodiment of a microchip laser wherein a half-confocal cavity is employed according to the present invention.

The present invention introduces a highly advantageous and heretofore unseen method and associated apparatus to enable monolithic microchip lasers that generate a variety of wavelengths, in particular, laser outputs at 457 nm, 473 nm, 491 nm, 505 nm, 532 nm, 593 nm, and 628 nm with low optical noise.

Referring now to the drawings and in particular to FIG. 1A, wherein a first embodiment of a monolithic microchip laser constructed according to the present invention is shown in a schematic form. The monolithic microchip laser 100 comprises pumping lights 115 and 125, laser gain media 160 and 170, a birefringent crystal 180, and a nonlinear optical crystal 190. These crystals are optically bonded and in physical contact with each other. Cavity mirrors 161, 171, and 191 are dielectric coatings and are respectively deposited onto the exterior surfaces of crystals 160, 170, and 190 to provide high reflectance and/or high transmittance at the desired wavelengths. With this monolithic architecture, the intrinsic passive cavity loss is minimized, while the thermal and mechanical stabilities of the cavity are improved. A high cavity Q is essential for efficient intracavity SFM or DFM, especially when a weak laser transition is involved.

For maximizing the walk-off angle ρ, the cut angle $θ_c$ of the birefringent crystal 180, which is the angle between the optic axis Z and the normal to the crystal surface, is preferably π/4 or 3π/4, depending on the type of the crystal.

In laser operation, the pump light 115 activates the gain media 160 while the pump light 125 activates the gain medium 170. One laser oscillation is formed between mirrors 161 and 191 and generates a laser beam 165 having a fundamental wavelength $λ_1$. Another laser oscillation formed between mirrors 171 and 191, generating a laser beam 175 with another fundamental wavelength $λ_2$. Preferably, the polarizations of these two laser beams are mutually orthogonal with proper orientations relative to the birefringent crystal 180 to form e-ray and o-ray, respectively. The laser beams 165 and 175 are combined in NLO 190 with type II phase matching to produce a new laser beam 195 with the reduced wavelength $λ_3=λ_1λ_2/(λ_1+λ_2)$ for SFM or increased wavelength $λ_4=λ_1λ_2/|λ_1-λ_2|$ for DFM and polarization o if 190 is a positive crystal or polarization e if 190 is a negative crystal. The newly generated laser beam 195 is extracted through the output coupler 191.

One advantage of this configuration is that power and polarization of the pumping sources 115 and 125 can be individually adjusted to maximize pumping efficiency and optimize wavelength conversion. Another advantage comes from the fact that laser oscillations are generated in different active regions so that problems related to intensity mismatch of the mixed fundamental radiations in a dual-wavelength gain medium, as encountered in the prior art, are resolved. A further advantage is attributed to elimination of the "green problem" because the fundamental wavelengths are generated in separate cavities. Yet another advantage of this configuration is all-time low noise output whether the fundamental laser beams are in single longitudinal mode (SLM) or multiple modes (MM) or a combination of SLM and MM. Due to their independent operation, the two fundamental lasers can be aligned independently to reach optimized overlap in the nonlinear crystal. In particular, the laser with a relatively high gain and, consequently less sensitivity to the ambient, has a slightly larger beam size so that the other laser with a smaller beam size will be easily overlapped. This makes the SFM or DFM laser output more stable, while the energy loss from the edge of the larger laser beam is limited.

An alternative embodiment of the present invention is shown in FIG. 1B, wherein a concave output coupler 130 is added in order to improve the beam collimation, which reduces optical loss and noise due to frequency filtration effect in the birefringent crystal 180 and is desirable for efficient and low-noise SFM, especially when the walk-off crystal is relatively thick. In addition, the concave output coupler 130 plays a role for compensating heat-induced distortion of the focal length and resolving the optical instability problem thereby. This type of hybrid-monolithic structure is particularly useful for pump sources of high power and/or small beam size.

Figure 1C:
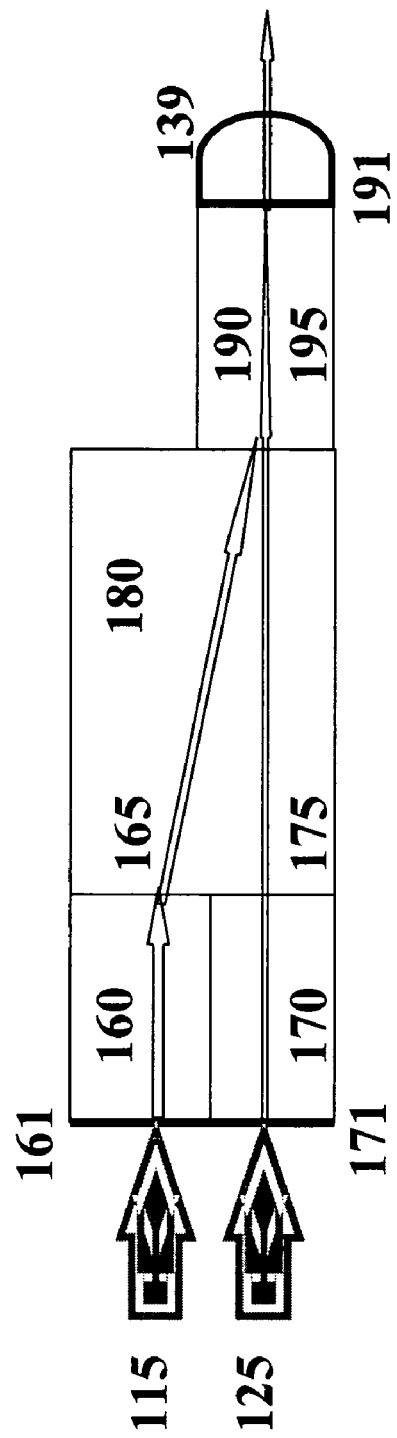
FIG. 1C is a schematic illustration of an alternative embodiment of a monolithic microchip laser wherein a concave mirror is attached to the nonlinear optical crystal to form half-confocal cavity.

Half-confocal resonator can also be made in monolithic structure. As shown in FIG. 1C, a concave output coupler 139 is optically bonded onto the exterior surface of the nonlinear optical crystal 190. An additional advantage of this configuration is heat dissipation enhanced by the output coupler 139.

Figure 1D:
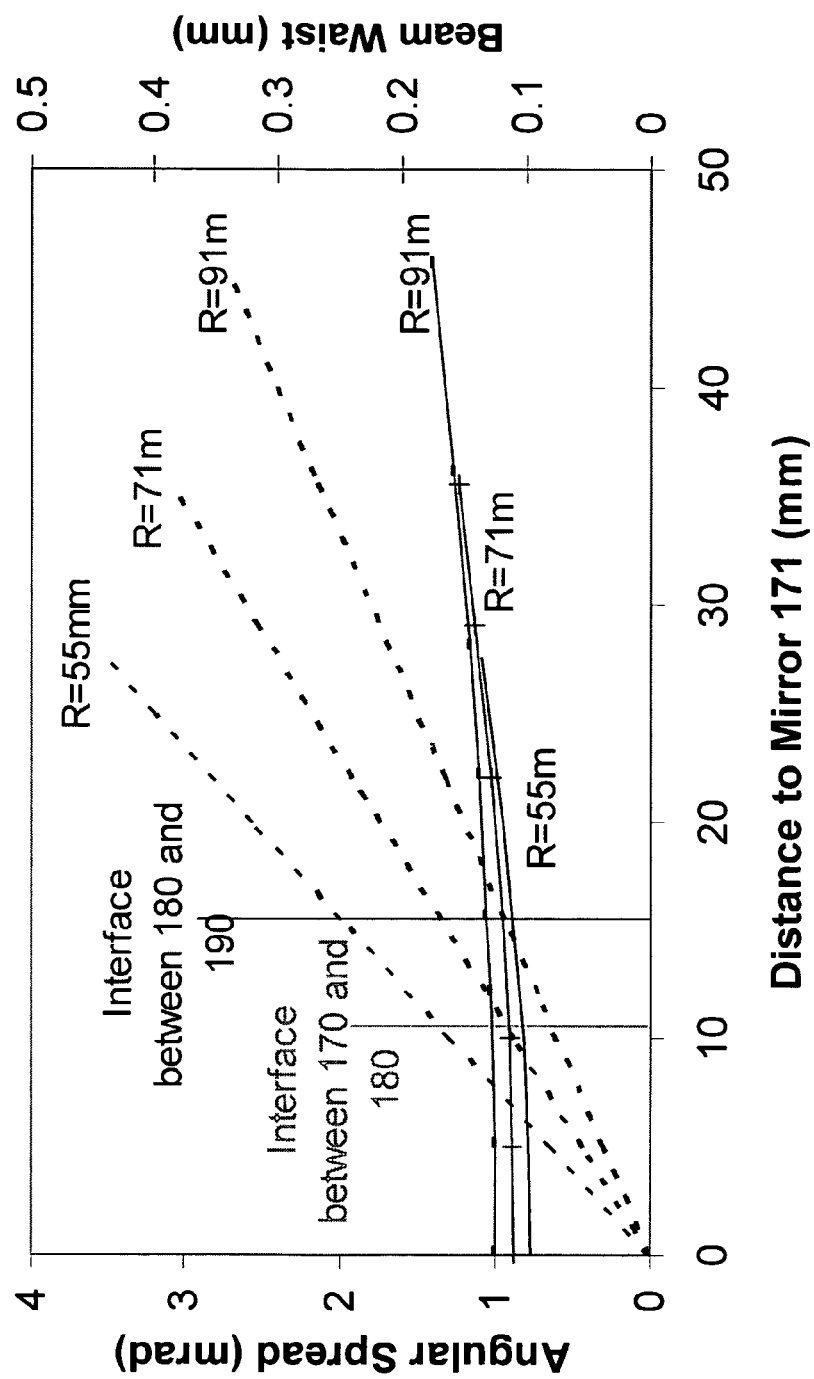
FIG. 1D shows angular divergence of the Gaussian beam 175 in FIG. 1B as a function of the distance to mirror 171.

FIG. 1D shows the angular divergence of a diffraction-limited Gaussian beam in laser cavities with a concave mirror of various curvatures, assuming the lengths of the gain medium 170, the birefringent crystal 180, and the nonlinear optical crystal 190 are, respectively, 0.5 mm, 10 mm, and 5 mm. As the radius of curvature increases, the beam divergence decreases. The total length of the half-confocal cavity equals the curvature divided by two. In all the cases studied, high degree of beam collimation is achieved in the birefringent crystal and in the nonlinear optical crystal.

The configuration illustrated in FIG. 1B can be alternated by folded resonators for best satisfaction of the requirements for long cavities and small beam waists. FIG. 1E shows an example of such systems.

The pumping sources 115 and 125 shown in FIGS. 1A, 1B, 1C, and 1E can be generated from two separated laser diodes, or two diode submounts packaged together for compact foot print, or two diodes packaged into a dual-emitter diode package to constitute a monolithic device, or two fiber-coupled emitters, or a pump diode with a beam splitting mechanism. Each pump beam is optically coupled to its corresponding laser gain medium through a direct coupling at close distance or through a set of beam shaping lenses or though a micro-integrated lens array. In the last embodiment, the glass lens array can be optically bonded to the outer surface of the gain medium to minimize the transmission loss. The monolithic microchip device composed of optically bonded pump lens arrays, gain media, birefringent crystal, and nonlinear crystal for SFM or DFM can be fabricated in large sizes and diced into many identical devices for low cost volume production.

Figure 1F:
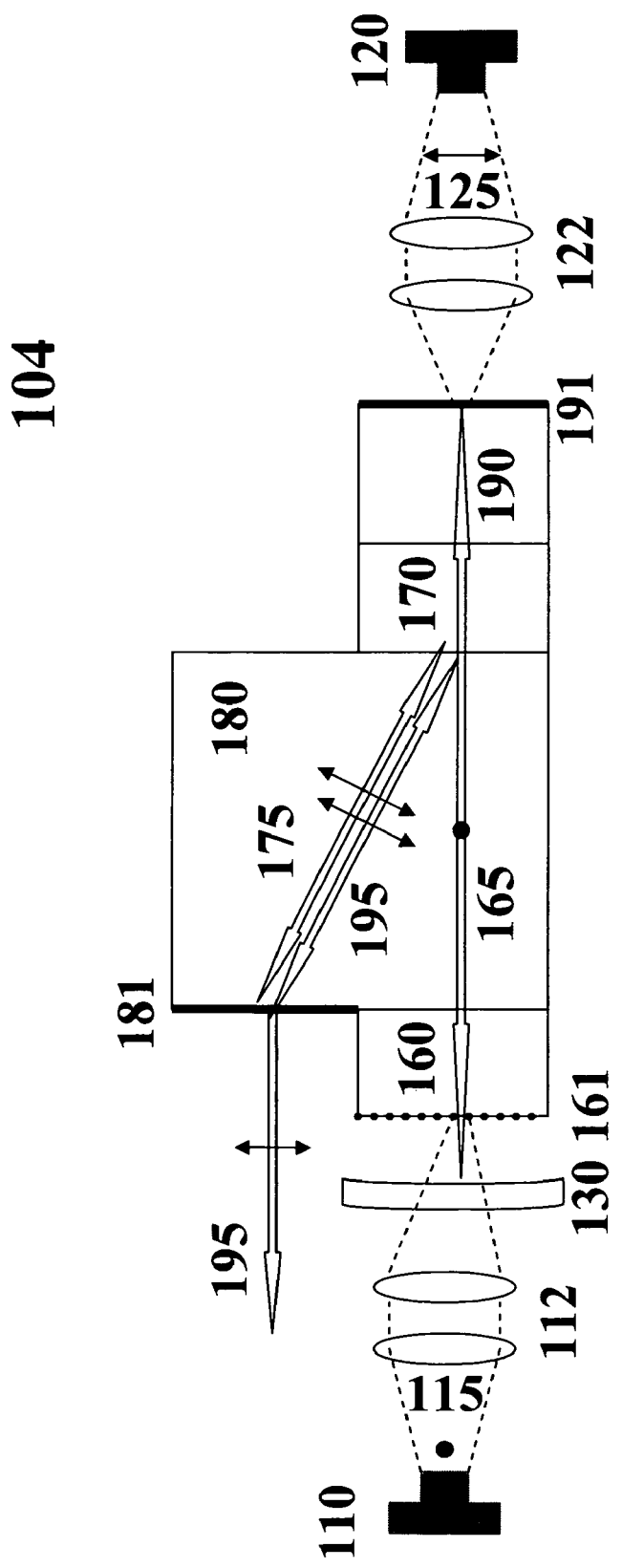
FIG. 1F is a schematic illustration of another alternative embodiment of a monolithic microchip laser wherein the two fundamental waves enter the nonlinear optical crystal from the two opposite sides according to the present invention.

Another alternative embodiment of the present invention is shown in FIG. 1F. The monolithic microchip laser 104 comprises pump sources 110 and 120, laser gain media 160 and 170, a birefringent crystal 180, and a nonlinear optical crystal 190. These crystals are optically bonded and in physical contact with each other.

The first pump source 110 emits the first pump light 115 linearly polarized along the direction whereof the first gain medium 160 exhibits the strongest absorption. On another side of the monolithic microchip laser 102, the second pump source 120 emits the second pump light 125 linearly polarized along the direction favorable to the absorption of the second gain medium 170. For isotropic gain media, polarizations of the pump beams are not required. Through the beam shaping elements 112 and 122, the pump lights 115 and 125 are focused and respectively enter into their corresponding gain media 160 and 170. In order to avoid possible cross-talking, these two gain media are preferably different materials and have no overlapped emission spectra. In comparison with the configurations illustrated in FIGS. 1A, 1B, 1C, and 1E, the two-sided pump scheme is more compact under certain circumstances because it eliminates the restriction related to the finite spacing between two pump sources.

Cavity mirrors 161, 181, and 191 are dielectric coatings and are respectively deposited onto the exterior surfaces of crystals 160, 180, and 190 to provide high reflectance (HR), anti-reflectance (AR), or high transmittance (HT) at the desired wavelengths. In particular, the mirror 161 is AR to the first pump wavelength $\lambda_{p1}$ and HR to the first fundamental wavelength $\lambda_1$. Similarly, the mirror 191 is AR to the second pump wavelength $\lambda_{p2}$ and HR to both the first and second fundamental wavelengths $\lambda_1$ and $\lambda_2$, as well as HR to the mixed wavelength $\lambda_m$, which is $\lambda_3 = \lambda_1 \lambda_2/(\lambda_1+\lambda_2)$ for SFM or is $\lambda_4 = \lambda_1 \lambda_2/|\lambda_1-\lambda_2|$ for DFM. The mirror 181 is HR to the second fundamental wavelength $\lambda_2$ and HT to the mixed wavelength $\lambda_m$. The mirrors 161 and 191 form the first resonant cavity to support oscillation of the first fundamental laser beam 165. On the other hand, the second resonant cavity, which is composed of the mirrors 181 and 191, supports oscillation of the second fundamental laser beam 175. In order to suppress lasing from competitive wavelengths, these mirrors are also coated HT to the unwanted wavelengths.

According to our inventive teachings, the gain media 160 and 170 are so oriented that the emitted lights 165 and 175 are respectively o-ray and e-ray in the birefringent crystal 180. These two fundamental beams are collinearly combined in the nonlinear optical crystal 190, wherein the SFM or DFM takes place. Advantageously, the frequency mixing based on this configuration is a resonant process. For type II phase matching in a negative crystal 190, the beam 195 at the mixed frequency is polarized in coincidence with the polarization plane of the second fundamental beam 175. Both beams depart from the first fundamental beam 165 due to the walk-off angle.

An optional concave mirror 130 can be implemented to form a half-confocal cavity, which improves the optical stability, especially when high power and/or small beam size are involved. In addition, locating the beam waist in the NLO crystal is of benefit to spatial overlap and, therefore, the efficiency for nonlinear frequency mixing. When the concave mirror 130 is utilized, the coating 161 is AR to the first pump wavelength $\lambda_{p1}$ while the interior surface of 130 is HT to the first pump wavelength and HR to the first fundamental wavelength. Optionally, another concave mirror may be added on the opposite side of the monolithic microchip laser, between the beam shaping element 122 and the NLO crystal 190, to form a confocal resonator.

Figure 2A:
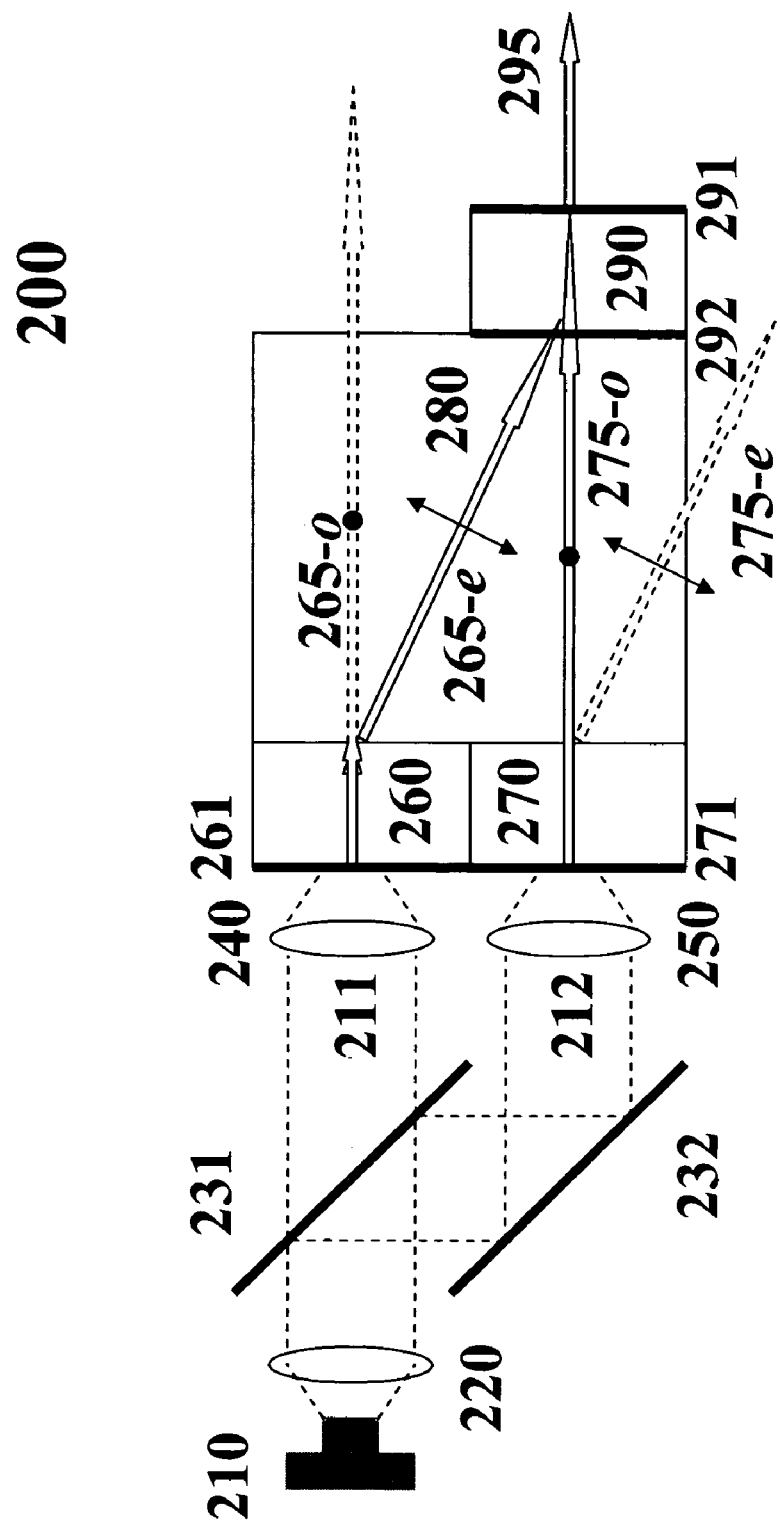
FIG. 2A shows a scheme for intracavity polarization control based on the walk-off effect.

According to the present invention, the walk-off effect in the birefringent crystal enables polarization discrimination in the absence of intracavity polarizers. With reference to FIG. 2A, wherein a design, which exploits directional difference between two orthogonally polarized beams after passing through a birefringent crystal, is shown. In particular, the ordinary component of the first fundamental beam, 265-*o*, if any, diverges away from the first cavity formed between the mirrors 261 and 291, which supports only oscillation of the extraordinary component 265-*e*. Similarly, the extraordinary component of the second fundamental beam, 275-*e*, if any, diverges away from the second cavity formed between the mirrors 271 and 291. Only the ordinary component 275-*o* is recycled. Insertion of an intracavity polarizer, which is required in the prior art for polarization selection, is not needed herein. After passing through the AR coating 292, the two fundamental beams 265-*e* and 275-*o* are combined in the NLO crystal 290, wherein the new wave at the sum frequency is generated.

An important application of the polarization discrimination scheme is monolithic microchip lasers, in which two fundamental laser beams are generated from a single gain medium isotropic in respect of emission polarization. As illustrated in FIG. 2B, two separated active regions in an isotropic gain medium 267 are respectively activated by pump beams 211 and 212 emanated from a dual-emitter 218. Collimation of an elongated light source such as a laser diode, which has large beam divergence along the plane perpendicular to the emitter, called fast axis, and smaller divergence along the plane of the emitter, called slow axis, can be accomplished by beam shaping optics 233, 234, and 236, which can be cylindrical macro- or micro-lenses oriented in the two orthogonal directions or a single lens made up of crossed cylindrical surfaces on each side of the lens. By matching the divergence of the fast axis with the divergence of the slow axis, pump beams with circular shape can be obtained. Since the length of the birefringent crystal 280 is proportional to the separation of the pump beams 211 and 212, and is a function of the walk-off angle, this pump scheme enables a very compact device structure. Of course, other pump sources such as two separated laser diodes or a pump diode with beam splitting mechanism can also be used.

Alternatively, the pump light sources can be two fiber-coupled emitters. As shown in FIG. 2C, the pump lights 211 and 212 extracted from the coupling fibers 219 and 229 (the emitters are not shown in this graph) are collimated and focused through beam shaping elements 235 and 245, which can be microlens arrays. With this configuration, the length of the birefringent crystal 280 can be further reduced because the separation between the two pump beams is essentially determined by the radius of the fibers, which in general are smaller than the distance between the two emitters.

As a result of optical pumping, population inversion is established in each activated region in the gain medium 267. In sharp contrast to the prior art, wherein polarization selection is accomplished by insertion of an intracavity polarizer, the inventive structures shown in FIGS. 2B and 2C select the desired polarization through the directional difference between the e-ray and o-ray in the birefringent crystal 280, which, according to our inventive teachings, also plays a role for intracavity beam combination. Due to the polarization discrimination, the resonant cavity composed of the mirrors 261 and 291 supports only oscillation of the stimulated emission linearly polarized in the principal plane of 280 to form the extraordinary beam 265-$e$, while the cavity between the mirrors 271 and 291 establishes resonant oscillation for the stimulated emission linearly polarized normal to the principal plane of 280 to form the ordinary beam 275-$o$. Frequency mixing takes place between the fundamental beams 265-$e$ and 275-$o$. With this configuration, the selectable gain media and achievable wavelengths are greatly extended. In addition, the device can be made extremely compact.

An interesting example of the gain media applicable to the configurations of FIG. 2B or FIG. 2C is Nd:YAG, which exhibits polarization-insensitive emission peaks around 1064 nm and 946 nm. With the configurations shown in FIG. 2B or FIG. 2C, it is possible to produce laser output at 532 nm or 473 nm or 501 nm, depending on cavity mirror coatings.

Another important application of the polarization discrimination scheme conceptually illustrated in FIG. 2A is a monolithic microchip laser comprising gain medium or media, in which two radiative transitions of different polarization states may be obtained from same upper and lower energy levels. For example, upon excitation by a pump light to energy level $^4F_{3/2}$, the extraordinary transition between $^4F_{3/2}$ and $^4I_{11/2}$ corresponding to wavelength of 1047 nm ($\pi$) and the ordinary transition between the same energy levels corresponding to wavelength of 1053 nm ($\sigma$) may occur simultaneously in Nd:YLF, with nearly equivalent stimulated emission cross-sections. Fundamental wavelengths are determined by the transition lines in the gain medium, the polarization states of the emission, the coating characteristics, and the different indices of refraction of the e-ray and o-ray in the birefringent crystal. Undesired stimulated emission may deplete the population of the upper state, which reduces the laser efficiency and even disturbs the frequency mixing process. In the configurations displayed in FIGS. 2B and 2C, lasing at undesired wavelength can be suppressed by orienting its polarization along unfavorable direction of the birefringent crystal 280. Advantageously, the fundamental beams are both polarized with extremely high purity.

By replacing the gain medium 280 in FIG. 2B or 2C with Nd:YLF, laser output at 525 nm (mixed from the $\pi$ line 1047 nm and the $\sigma$ line 1053 nm) or 658 nm (mixed from the $\pi$ line 1321 nm and the $\sigma$ line 1313 nm) or 583 nm (mixed from the $\pi$ line 1047 nm and the $\sigma$ line 1313 nm) or 586 nm (mixed from the $\pi$ line 1321 nm and the $\sigma$ line 1053 nm) can be produced.

Figure 2D:
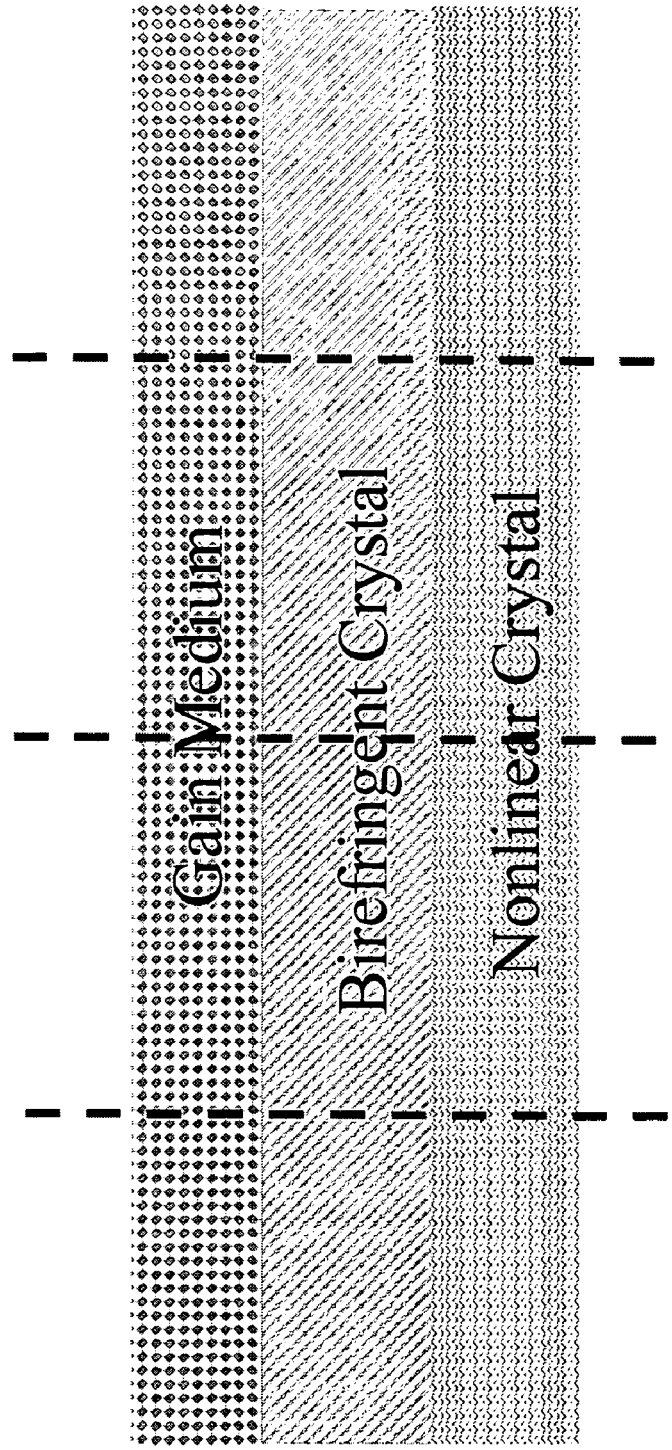
FIG. 2D shows a scheme for wafer-level fabrication of the monolithic microchip lasers according to the present invention.

Using a single gain medium has a further advantage: making high volume fabrication feasible. As shown in FIG. 2D, the gain medium, the birefringent crystal, and the nonlinear optical crystal can be grown into layers with uniform coatings at appropriate wavelengths, which may be broadband. In some applications, microlens arrays can be deposited on the substrate. The integrated crystal is then cut into small pieces, each forms a microchip laser. This scheme greatly improves the productivity and reduces the cost.

Our inventive teachings can be better understood through investigation of the following examples.

EXAMPLE 1

Monolithic Microchip Laser for Generating 491.7 nm Light

Returning to FIG. 1A. In this specific example, the monolithic microchip laser 100 consists of two independent pumping sources 115 and 125, two Nd:YVO$_4$ laser gain media 160 and 170, a birefringent crystal such as un-doped YVO$_4$ or TiO$_2$ 180, and a nonlinear crystal KTP 190. These crystals are optically bonded and in physical contact for elimination of the boundary optical loss in generation of intracavity SFM or DFM.

In a preferred embodiment, the pumping lights 115 and 125 are output from a build-in dual-emitter diode laser that emits two individual laser beams, but can also from two separate emitter diode lasers, depending on specific applications. Each emitter can have a 1 µm×50 µm aperture and emit upto 500 mW power output at 808 nm or have 1 µm×200 µm aperture and emit upto 2 W power output at 808 nm or other aperture size to emit an appropriate power. These two emitters are separated each other with a preferable distance of 500 µm, which corresponds to ~5 mm length of the birefringent crystal 180, or other distances that match the walk-off displacement upon propagation through 180 of a given length. The pump light 115 activates the gain medium 160 and the light 125 activates 170. Preferably, these pumping beams are polarized along the $\pi$ direction of their corresponding gain medium for best absorption efficiency.

The laser gain media 160 and 170 each are 1 mm long with 1% Nd-doped concentration or 0.5 mm long with 4% Nd-doped concentration or other appropriate combinations of length and Nd-doped concentration, and are a-cut to produce linearly polarized laser beam along the $\pi$ direction. Preferably, the C-axes of laser gain media 160 and 170 are orthogonal to each other so that the laser beam generated from 160 is polarized in the principal plane of the birefringent crystal 180, known as e-beam, whereas the beam from 170 has the polarization normal to the principal plane, called o-beam.

One side of the gain medium 160 is a coating 161, highly reflective (HR) at 914 nm and highly transmissive (HT, T>95%) at 808 nm. Similarly, the exterior side of the gain medium 170 is coated HR at 1064 nm and HT (T>95%) at 808 nm. The coating 161 should also be HT at 1064 nm and 1342 nm to prevent these high-gain transitions from lasing. The coating 191 on another side of microchip 100 is HT at 491.7 nm (T>95%), and HR at both 914 and 1064 nm.

Figure 3A:
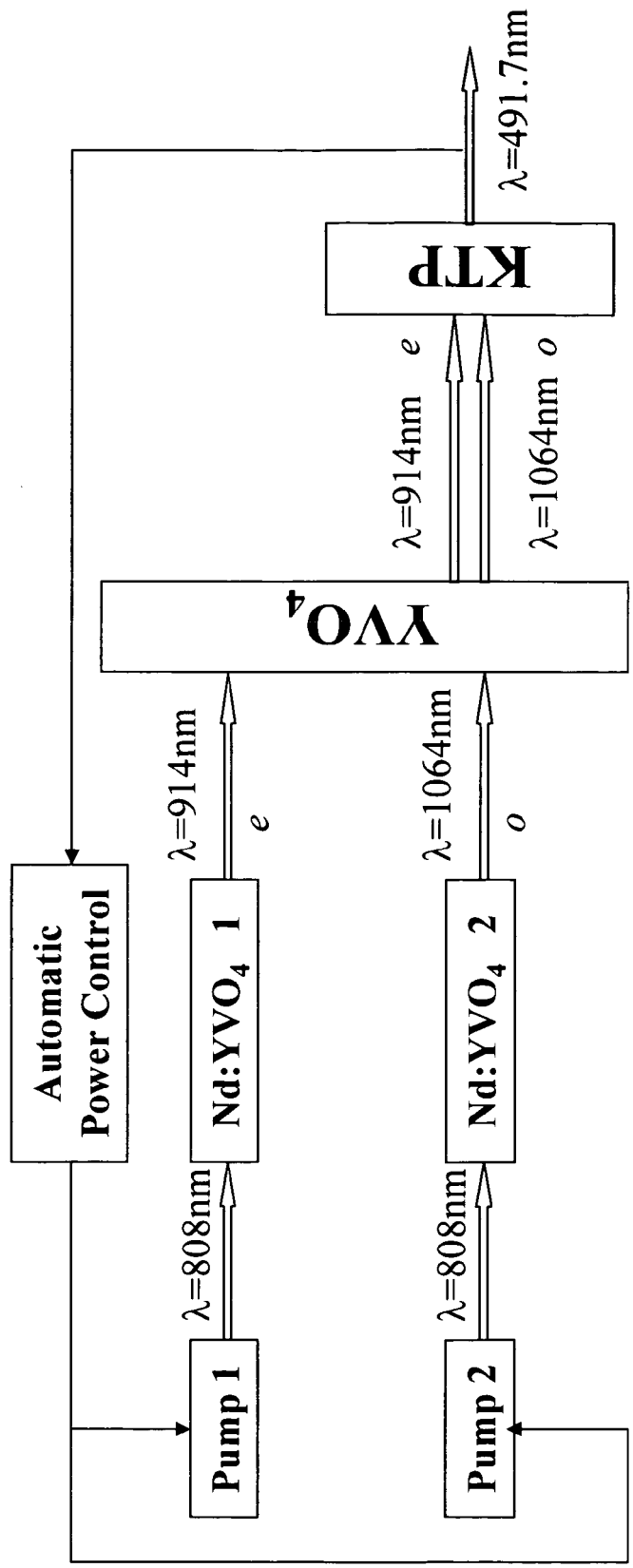
FIG. 3A is a flowchart of wavelength conversion for 491 nm laser.

In operation, the gain media 160 and 170 are longitudinally pumped by the pumping sources 115 and 125. Upon excitation from the ground state $^4I_{9/2}$ to the metastable state $^4F_{3/2}$ by the pumping sources, laser gain media 160 and 170 respectively emit 914 nm and 1064 nm beams. Within the birefringent crystal 180, the 914 nm beam is e polarized, whereas the 1064 nm laser beam is o polarized. Owing to the walk-off effect, these two beams are combined at the exit of the birefringent crystal 180. With precise control of the un-doped $YVO_4$ or $TiO_2$ crystal length, the two fundamental beams collinearly enter the nonlinear optical crystal KTP 190 and frequency-mixed therein. In some applications, configurations illustrated in FIG. 1B or 1C or 1E or 1F can be used. FIG. 3A shows a flowchart of the wavelength conversion.

Advantageously, an algorithm for automatic power control enables individual adjustment of pumping powers for optimizing SFM efficiency. Still advantageously, a single thermoelectric controller (TEC) is employed for automatic temperature control of both laser diodes and the monolithic device. Alternatively, the TEC can be removed for low power consumption devices.

EXAMPLE 2

Monolithic Microchip Laser for Generating 593.5 nm Light

Continuing in reference to FIG. 1A. With modification of some parameters, the same configuration can be applied to other wavelength conversion devices, e.g., 593.5 nm lasers. These parameters include proper selection of mirror coatings and KTP phase matching angle.

In order to generate laser output at 593.5 nm, the coating 161 should be highly reflective at 1064 nm and highly transmissive (T>95%) at 808 nm. Similarly, the mirror 171 is coated HR at 1342 nm and HT at 808 nm. The coating 171 is also HT at 1064 nm to prevent this high-gain transition from lasing. The coating 191 on the exterior surface of microchip 100 is HT at 593.5 nm, and HR at both 1342 and 1064 nm. In some applications, configurations illustrated in FIG. 1B or 1C or 1E or 1F can be used.

Figure 3B:
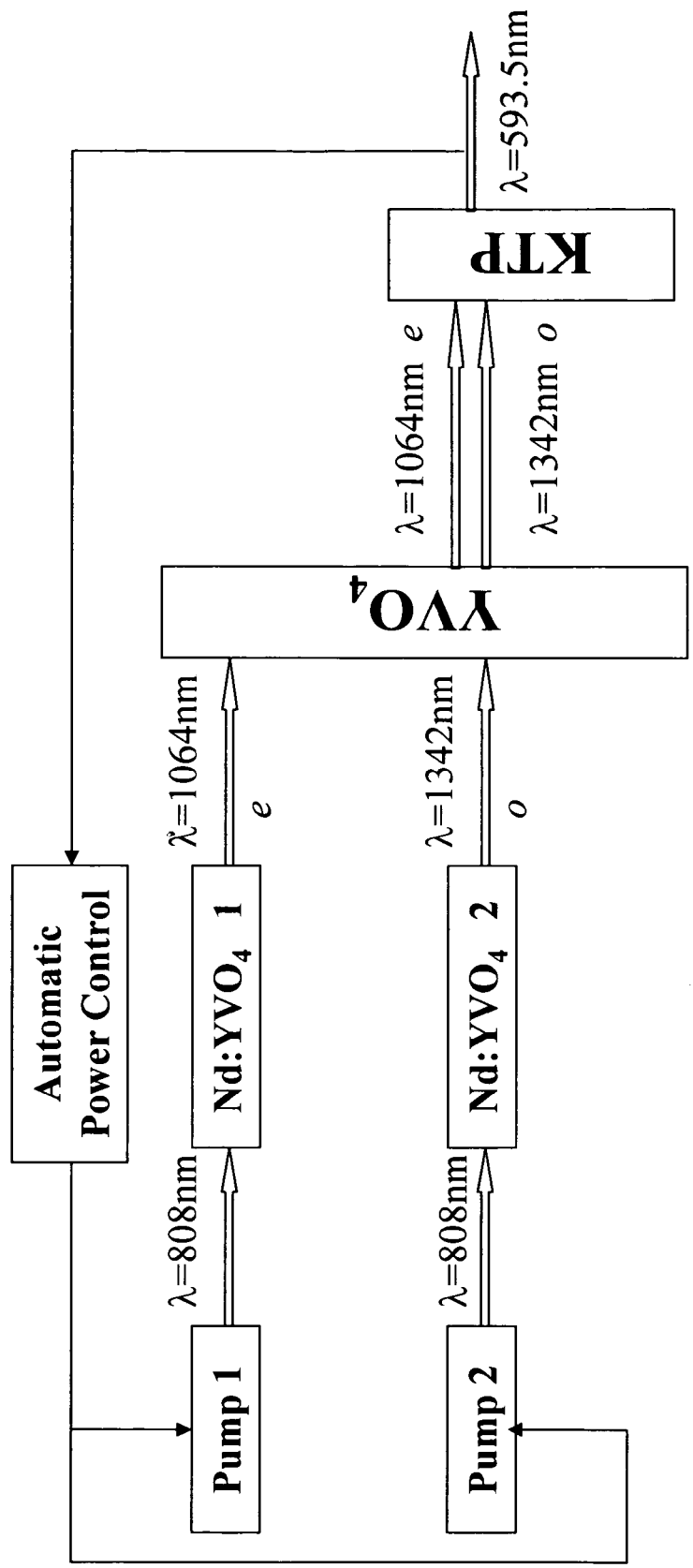
FIG. 3B is a flowchart of wavelength conversion for 593 nm laser.

FIG. 3B shows a flowchart of the wavelength conversion. Advantageously, an algorithm for automatic power control enables individual adjustment of pumping powers for optimizing SFM efficiency. Still advantageously, a single thermoelectric controller (TEC) is employed for automatic temperature control of both laser diodes and the monolithic device. Alternatively, the TEC can be removed for low power consumption devices.

It should be noted that the above examples are for description only and by no means of limitations of our inventive teachings. It should also be recognized by those skilled in the art that selection of the crystal materials, the doped ions, the coatings, and geometries of microchip cavities is a matter of engineering design.

For further understanding of our inventive teachings and design principles, some numerical analysis is given.

Analysis 1: Pump Beam Separation and Birefringent Crystal Length

Due to the walk-off effect, an extraordinary (e) wave passing through a birefringent crystal is redirected by a walk-off angle ρ, while an ordinary (o) wave is not. If these two beams coincide with each other before entering a birefringent crystal and the crystal length is l, then a separation d=l tan ρ is observed at the output surface of the crystal.

Figure 4:
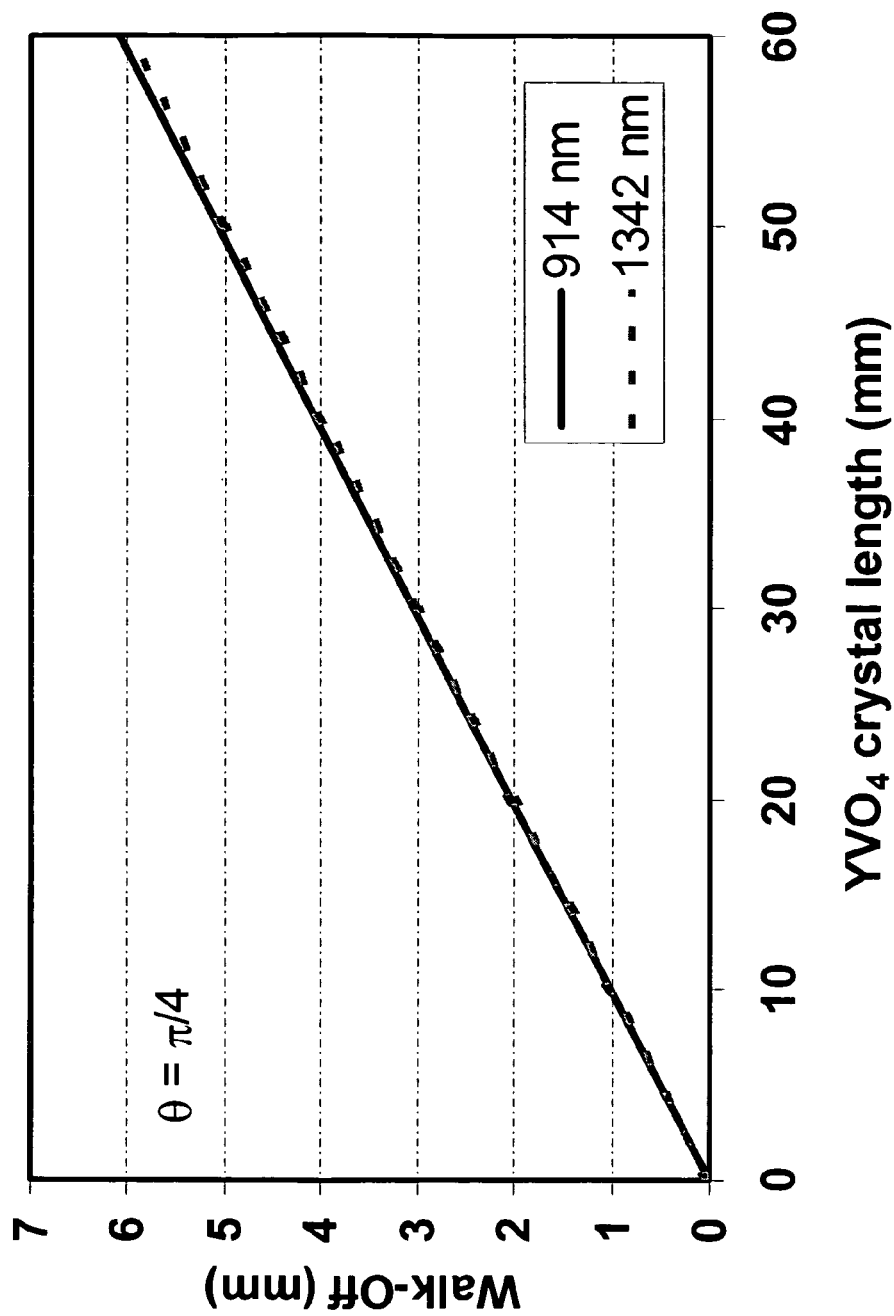
FIG. 4 shows walk-off displacement as a function of $YVO_4$ crystal length at 914 nm and 1342 nm.

In reference to our inventive structure shown in FIG. 1A, the displacement of the e-beam propagation direction d determines the optimal separation of the pump beams. In order to overlap o-beam and e-beam in the nonlinear crystal 190, one can either adjust the displacement d for a given birefringent crystal 180, or adjust the crystal length l for a given pump beam separation. FIG. 4 shows the dependence of these two parameters for an un-doped $YVO_4$ at 914 nm and 1342 nm, assuming the angle between the wave propagation direction and the optic axis of the birefringent crystal θ=π/4. Interestingly, the walk-off displacement is insensitive to the wavelength. This is an advantage for the microchip design.

Analysis 2: SFM Power and Pump Power

According to the present invention, the fundamental laser beams are generated in separate resonant cavities and different gain media activated by individual pumping sources. This allows individual adjustment of operation parameters for each laser to optimize the SFM efficiency.

With reference to the foregoing Example 1, wherein a 491 nm laser output is obtained by mixing two fundamental beams, respectively, at 914 nm, which is generated from the transition $^4F_{3/2} \rightarrow ^4I_{9/2}$, and 1064 nm, which is generated from the transition $^4F_{3/2} \rightarrow ^4I_{11/2}$. In a Nd:$YVO_4$ gain medium, the stimulated emission cross section for the transition $^4F_{3/2} \rightarrow ^4I_{9/2}$ is about an order of magnitude smaller than that for the transition $^4F_{3/2} \rightarrow ^4I_{11/2}$. To compensate this difference, the laser gain medium for generation of 914 nm light should be pumped by a larger power.

Figure 5A:
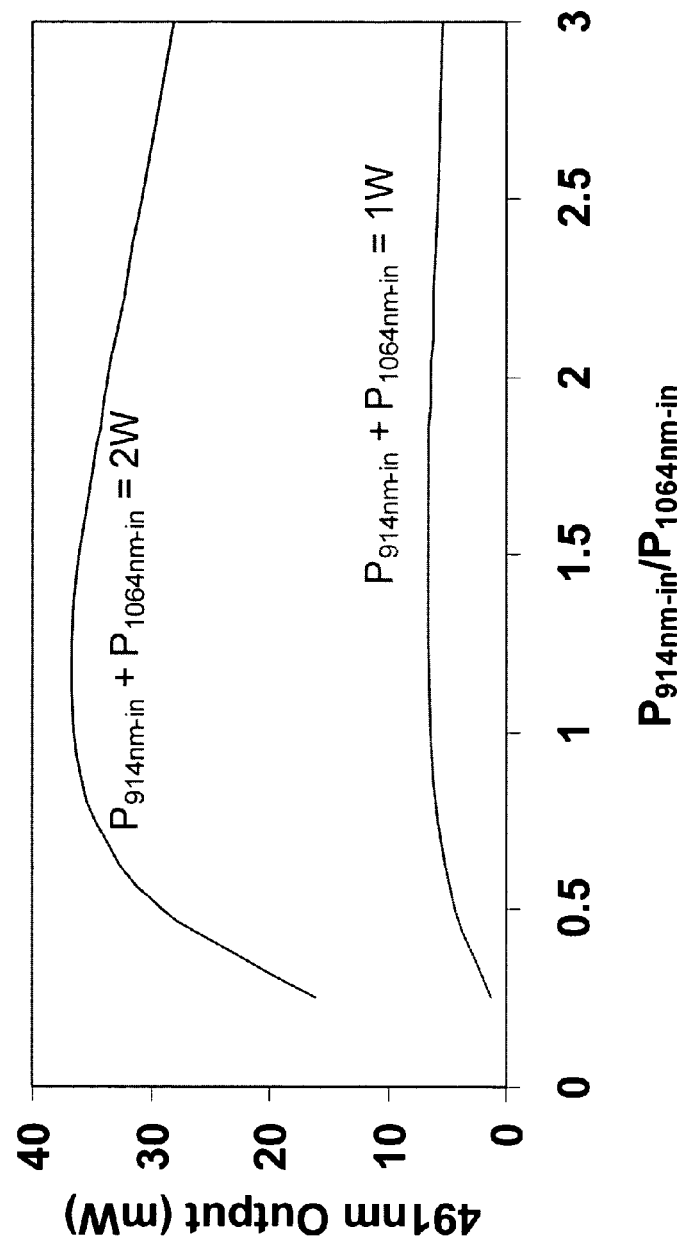
FIG. 5A shows dependence of the 491 nm laser output power on the pump power ratio.

Plotted in FIG. 5A are curves showing the dependence of 491 nm laser output power on the pump ratio $P_{914nm\text{-}in}/P_{1064nm\text{-}in}$ at total pump power of $P_{in}=P_{914nm\text{-}in}+P_{1064nm\text{-}in}=1$ W and 2 W. The curve peak identifies optimized pump ratio at the given $P_{in}$. As the pump ratio increases from the threshold, the SFM efficiency increases rapidly. After reaching its optimal value, it decreases slowly, especially if the total pump power is low.

Figure 5B:
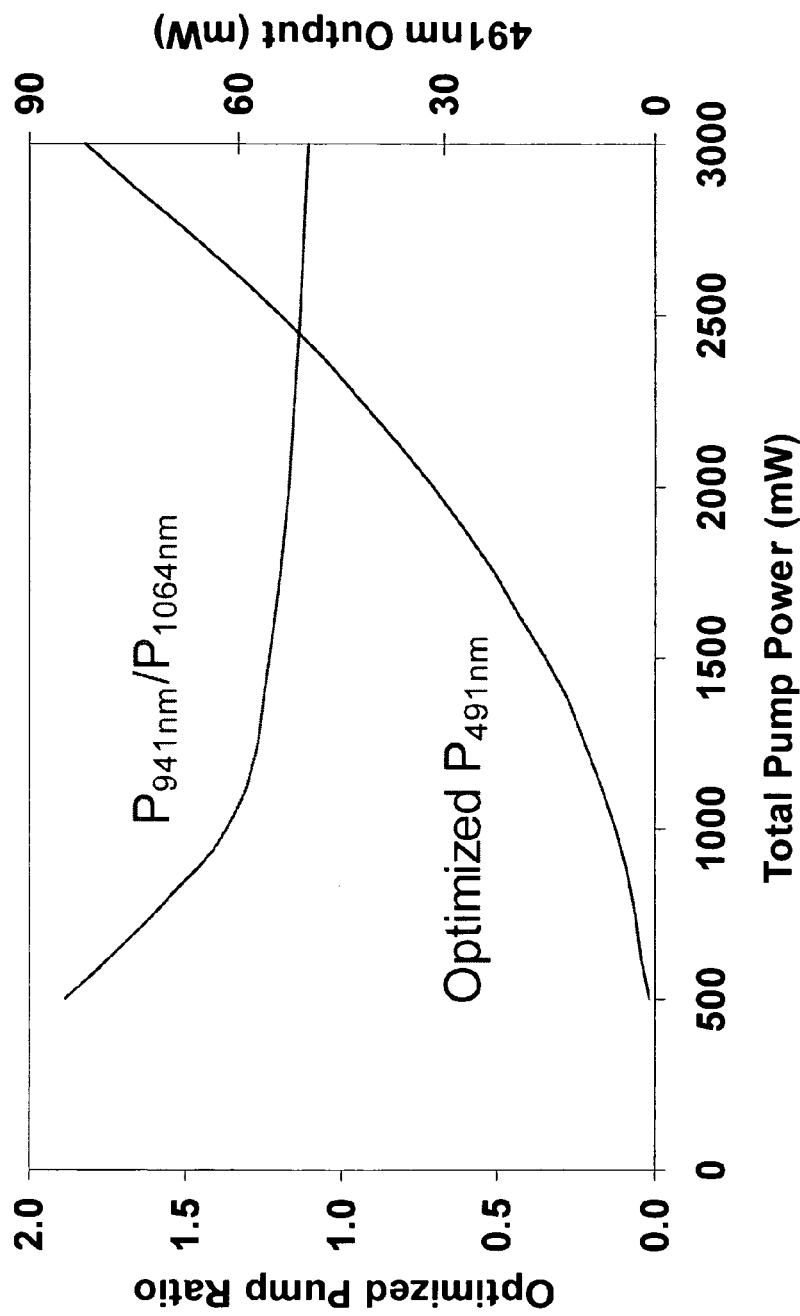
FIG. 5B shows the optimized pump power ratio and the corresponding 491 nm laser output power as a function of the total pump power.

FIG. 5B shows the dependence of the optimized pump ratio on the total pump power. The monotonically decreasing trend to its asymptote $P_{914nm\text{-}in}/P_{1064nm\text{-}in} \rightarrow 1$ as the total pump power $P_{in} \rightarrow \infty$ indicates that optimization of the pump intensity ratio is particularly useful for relatively low power pumping. Also shown in FIG. 5B is the optimized 491 nm output as a function of the total pump power. In particular, nearly 80 mW of 491 nm laser output can be obtained by the use of total pump power of 3 W. This makes replacement of Argon ion laser with the microchip laser possible. Based on these relationships, an algorithm for automatic power control, which ensures optimized SFM efficiency all the time, can be developed.

Figure 6A:
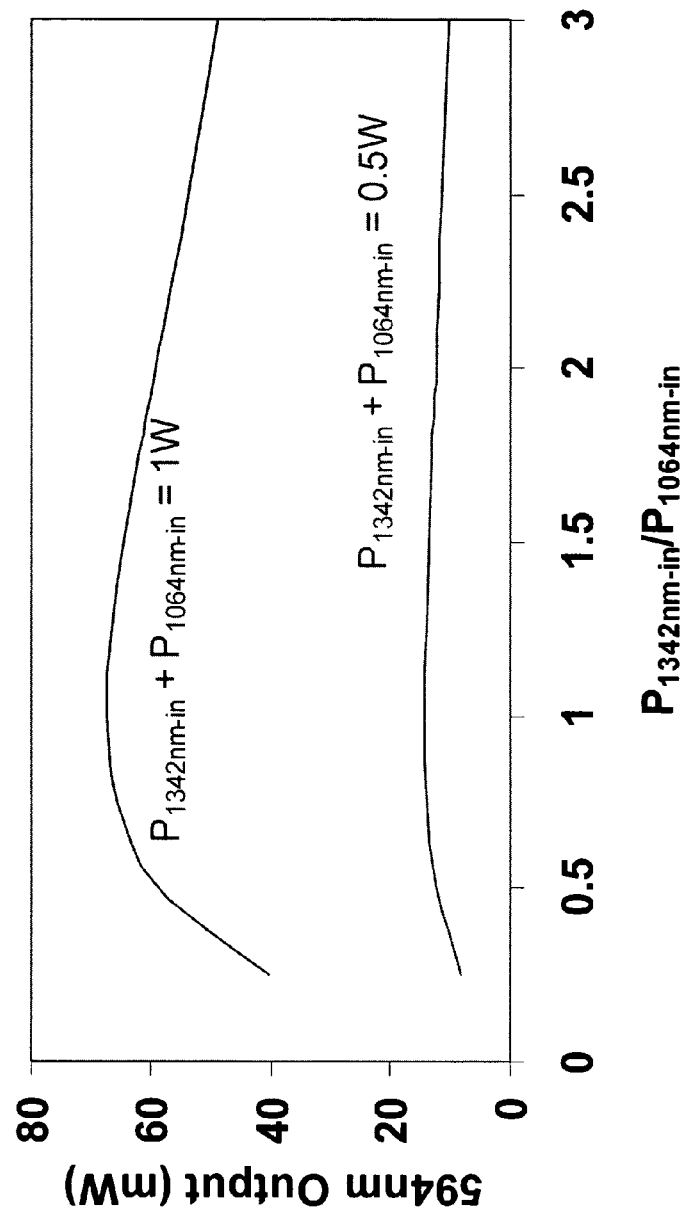
FIG. 6A shows dependence of the 593 nm laser output power on the pump power ratio.

Similarly, optimized SFM laser output at 594 nm can be obtained by individually adjusting the pump powers for the two fundamental lines. A quantitative dependence of the 594 nm laser output power on the pump ratio $P_{1342nm\text{-}in}/P_{1064nm\text{-}in}$ at total pump power of $P_{in}=P_{1342nm\text{-}in}+P_{1064nm\text{-}in}=0.5$ W or 1 W is shown in FIG. 6A. In comparison with the curves for 491 nm, which are shown in FIG. 5A, the SFM efficiency for 594 nm appears more sensitive to the pump ratio at the same total pumping rate.

Figure 6B:
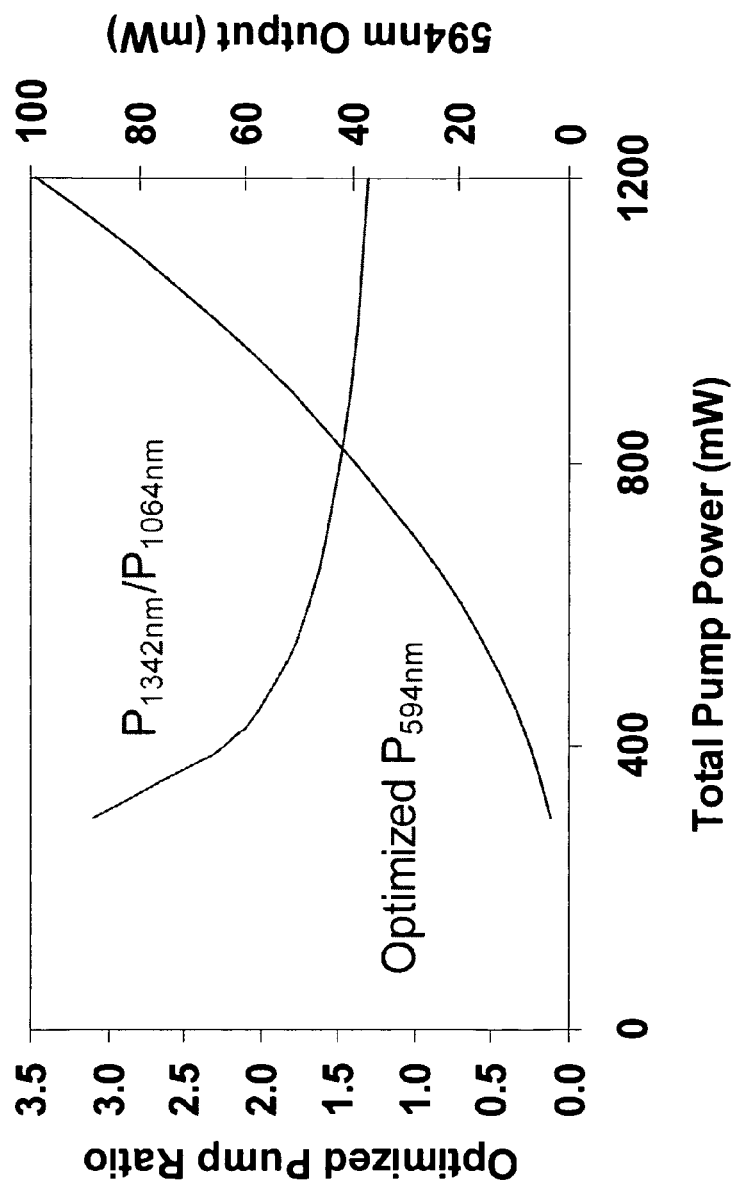
FIG. 6B shows the optimized pump power ratio and the corresponding 593 nm laser output power as a function of the total pump power.

FIG. 6B shows the optimized pump ratio and the corresponding SFM output as functions of the total pump power. With optimized partition of 1.2 W pump power into Pump 1 and Pump 2 shown in FIG. 3B, it is possible to obtain 100 mW 594 nm laser output. Although 594 nm laser output can also be obtained through intracavity SFM using the methods disclosed in the prior art, the present invention greatly improves the efficiency.

Analysis 3: Generation of Other Visible Wavelengths

With the present invention, lasers at various visible wavelengths can be generated through selection of appropriate laser transitions, doped ions, and crystals. This is an important advantage of the present invention because many of these wavelengths are unavailable from a direct SHG or SFM based on the prior art. Tables 1A-1C show some examples, which are by no means a complete list. It should be pointed out that the emission spectra of the Yb-doped crystals are broadband. Therefore, the wavelengths presented in Table 1C are tunable.

Analysis 4: Generation of IR Wavelengths

With the present invention, lasers at various IR wavelengths can be generated through selection of appropriate laser transitions and DFM from proper nonlinear crystals. This is an important advantage of the present invention because many of these wavelengths are unavailable from a direct laser generation. Tables 1A and 1B show some examples, which are by no means a complete list.

As will become clearer from further descriptions hereinafter, our invention can be embodied and configured in a variety of ways according to different applications. With this flexibility, many additional advantages of the present invention can be demonstrated.

§1. With attachment of one or more optical elements of appropriate properties on one or each gain medium, a number of optional features can be obtained.

Figure 7A:
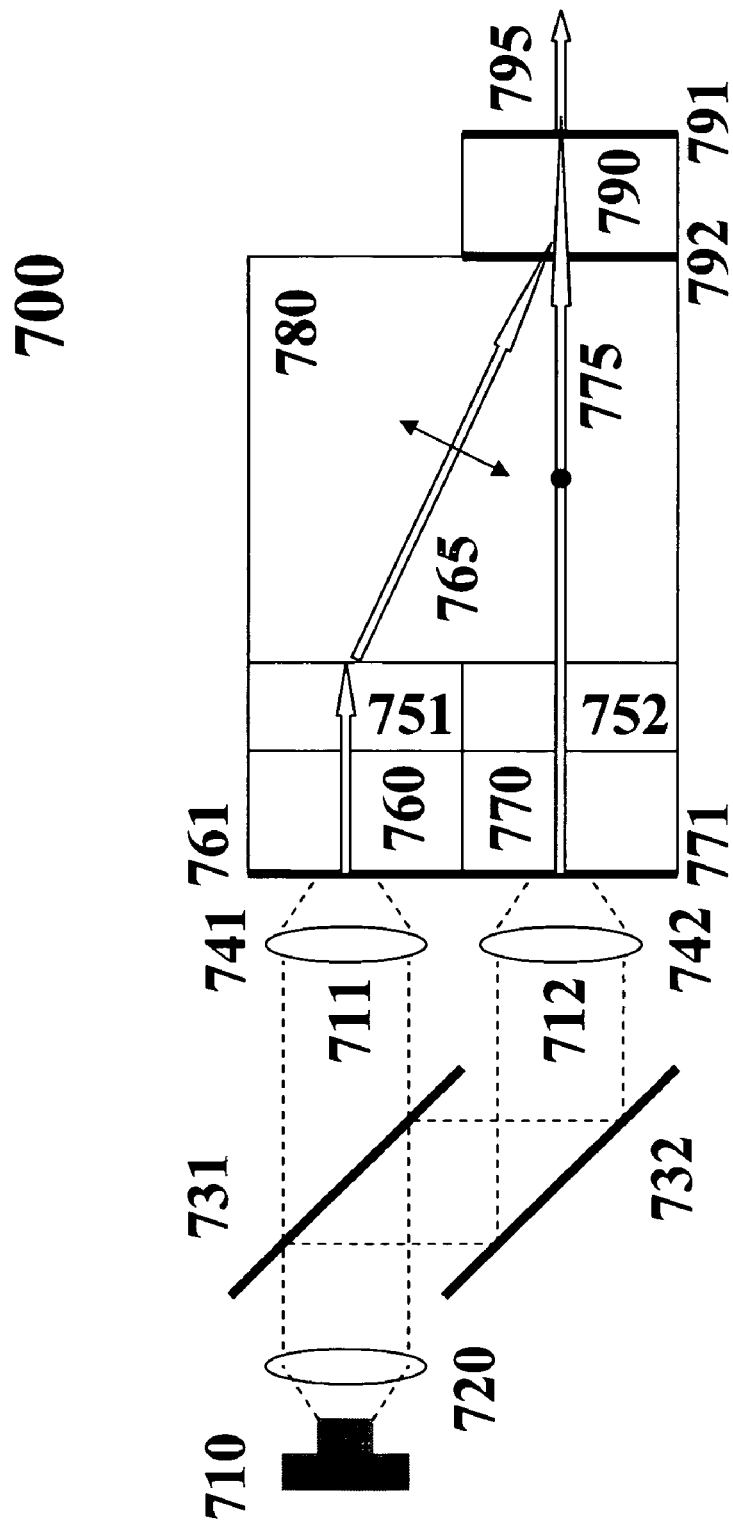
FIG. 7A is a schematic illustration of a preferred embodiment of the inventive monolithic microchip laser operated in single longitudinal mode.

As a first example, attaching a wavelength selection element such as a Lyot birefringence filter or an intracavity etalon enables the monolithic microchip laser to oscillate on a single longitudinal mode with low intracavity loss and noise. As shown in FIG. 7A, a wavelength selection element 751 is sandwiched in between the gain medium 760 and the birefringent crystal 780 so that the fundamental beam 765 is SLM. Similarly, a wavelength selection element 752 is inserted between the gain medium 770 and the birefringent crystal 780, which leads to single longitudinal mode of the second fundamental beam 775. Therefore, the mixed laser output 795 is also SLM.

It should be pointed out that there may be many alternative configurations to achieve SLM operation. For example, as a modification of the configuration shown in FIG. 1E, the wavelength selection elements 751 and 752 can be respectively inserted between the gain medium 160 and the birefringent crystal 180 and between the gain medium 170 and the birefringent crystal 180. In this way, the SLM monolithic microchip laser can be made very compactly.

By adding a birefringent crystal layer to the structure illustrated in FIG. 2D for wavelength selection, high-volume fabrication of SLM microchip lasers becomes feasible.

Figure 7B:
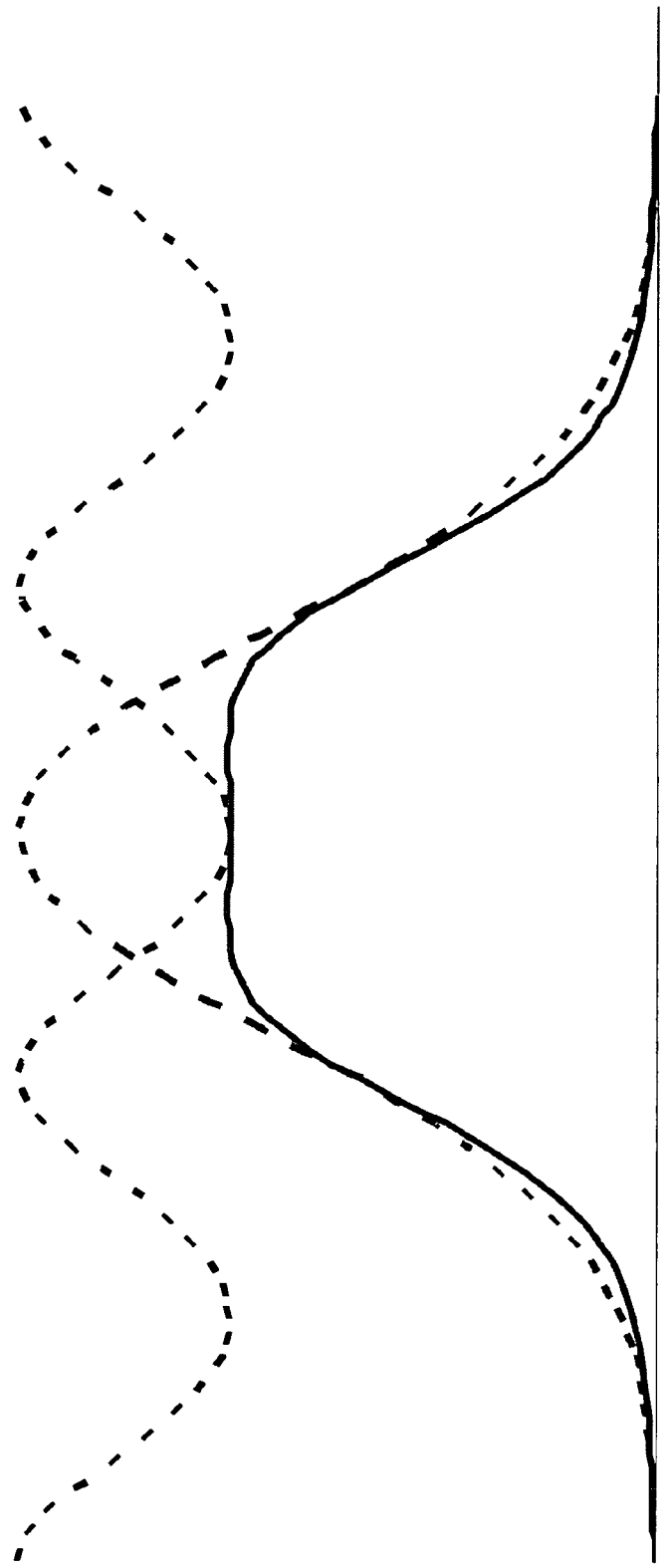
FIG. 7B shows a scheme for producing laser output with flat-top spectrum.

As a second example, by attaching an off-tuned etalon for gain compensation, broadband and multimode laser output can be achieved from the monolithic microchip laser. Conventionally, etalons are inserted into laser resonators for wavelength selection. In contrast to these applications, tuning a minimum in the transmission curve of an etalon (dotted oscillating curve) in coincidence with the peak of the gain profile (dotted Gaussian curve), as graphically illustrated in FIG. 7B, results in a flat-top spectrum of laser output, which can be applied to laser optical scanning systems, optical memory devices, laser raster printing systems, laser display systems, inspection systems, lithographic systems, imaging instrumentation, and other applications where speckle reduction is necessary. Flat-top spectral output can also be extracted from resonators that are formed with specially coated mirrors for gain flattening.

Other methods for laser speckle reduction includes intentional introduction of optical phase distortions. This can be practically realized by implementation of chirped dielectric mirrors of positive dispersive properties for enhancing phase shift difference involved in reflection of various oscillation modes.

As a third example, a set of frequency filters such as Lyot filters can be attached to obtain laser output of desired spectral bandwidth.

As a fourth example, the attached optical elements can be electro-optic devices such as Pockels or Kerr cells, which produce electrically controlled birefringence for cavity Q transition, or acousto-optic devices, whose transparency is sensitive to the passage of ultrasonic wave, or a doped crystal characteristic of fluence-dependent transmission for generation of high pulse power through Q-switching or mode lock. With this type of configurations, dual Q-switched laser is achievable from the monolithic structure. When the Q-switches on the two arms are controlled independently, two sequential pulses with an adjustable time delay can be produced. Such laser systems are especially useful for time-of-flight applications.

§2. One fundamental laser beam can be produced from sources such as laser diodes, or other external laser systems with or without harmonic generations, or optical parametric oscillators (OPO) in replacement of the internal gain medium emission. With this flexibility, the available wavelength range can be further extended. Moreover, specially designed features incorporated into these sources can be carried over.

One example is graphically illustrated in FIG. 8A. In this monolithic microchip laser 801, the second gain medium is removed. As a replacement, a laser diode 820 is employed for producing the second fundamental beam 875, which, in this particular configuration, is an o-ray. As shown in this graph, the laser diode 820 is controlled by a drive circuit 825, which can be RF modulated for stabilizing the laser operation. With RF modulation, the laser diode 820 is forced to operate at multiple modes. Noise associated with mode hop and/or mode partition, as well as speckle noise due to interference pattern resulted from reflection or transmission of highly coherent light from optically rough surfaces can be eliminated or reduced. Alternatively, the fundamental beam emitted from the laser diode 820 can be characterized as an e-ray, provided that the gain medium 860 emits another fundamental beam, which behaves ordinarily (o-ray) in the birefringent crystal 880.

Figure 8B:
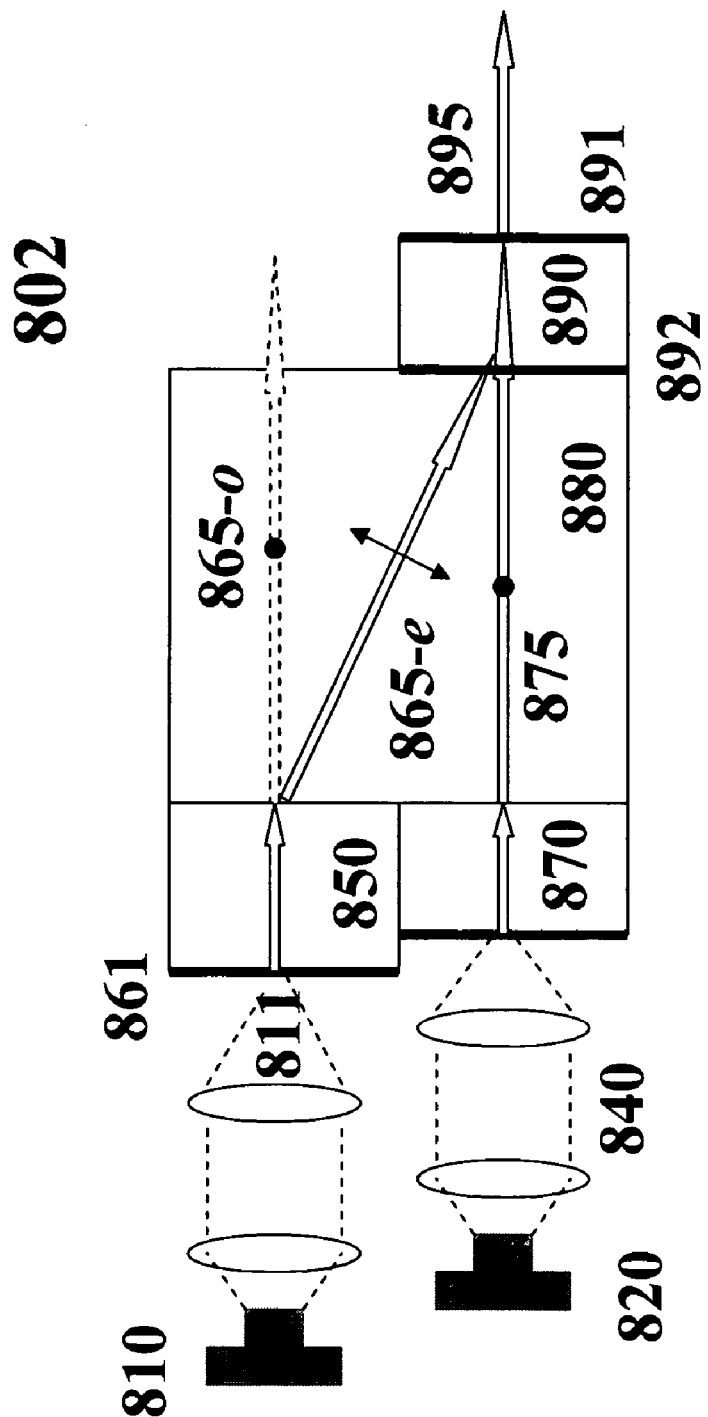
FIG. 8B shows a preferred embodiment of the inventive monolithic microchip laser, in which one fundamental laser beam is generated from an optical parametric oscillator.

Another example is illustrated in FIG. 8B, where one fundamental beam is generated through optical parametric oscillation, which is the reverse process of sum frequency generation. By introducing a pump beam, a signal wave and an idler wave appear in the birefringent crystal 880. The specific wavelengths of the signal and the idler, $\lambda_s$ and $\lambda_i$, are determined by the phase matching conditions and the inclination of the cutting angle of the nonlinear optical crystal 850, in which the optical parametric oscillation takes place. The pump beam 811 can be generated by a laser diode or a diode pumped solid-state laser or any other laser device that produces a linearly polarized light with appropriate wavelength.

For type II phase matching, one of the output beams involved in the OPO is polarized along the principal plane of the birefringent crystal 880, known as e-ray, and the other has a polarization normal to the principal plane, known as o-ray. For the configuration shown in FIG. 8B, the e-ray, 865-$e$, walks off the propagation direction and combines with another fundamental beam 875, emitted from the gain medium 870, in the NLO crystal 890, wherein the sum frequency is generated. On the other hand, the o-component, 865-$o$, diverges away from the resonant cavity. An advantage of this configuration is elimination of possible interference between the signal and the idler.

In an alternative configuration, the fundamental laser beam 875 is polarized as an e-ray in the birefringent crystal 880, which, under the phase matching conditions, combines with another fundamental beam, the o component of the OPO output, 865-$o$, for the nonlinear sum frequency mixing process. In this case, the e component, 865-$e$, diverges away from the resonant cavity as a loss.

Although the optical parametric oscillation demonstrated in FIG. 8B is for type II phase matching, this should not be understood as a restriction of our invention. As a matter of fact, optical parametric oscillation that fulfills type I phase matching can also be utilized as a source for generation of the fundamental beam. In this case, the signal and the idler have the same propagation direction and can be distinguished by their wavelengths, more specifically, by proper coating of the resonant cavity mirrors, so that their reflectivity is peaked around the desired fundamental wavelength while is low at the unwanted wavelength to introduce loss.

Tunability is a fundamental characteristic of all parametric devices. Therefore, with the aid of a mechanism for change of the phase matching conditions, the configuration demonstrated in FIG. 8B enables achievement of wavelengths tunable over a range. Phase matching conditions can be changed by making use of the angular dependence of the birefringence of anisotropic crystals, or by temperature variation, or by electro-optic variation of the refractive indices.

An important application of the configurations described in FIGS. 8A and 8B is to produce red light. For example, wavelength 628 nm can be generated by sum frequency mixing of 1064 nm and 1530 nm. The fundamental wavelength 1064 nm can be directly obtained from stimulated emission of Nd:YAG or Nd:YVO$_4$. Another fundamental wavelength 1530 nm can be extracted from a laser diode or the signal wave of a KTP OPO pumped by 1064 nm.

§3. A birefringent crystal can be employed for splitting one pump beam into two components of orthogonal polarizations based on the walk-off effect.

Figure 9A:
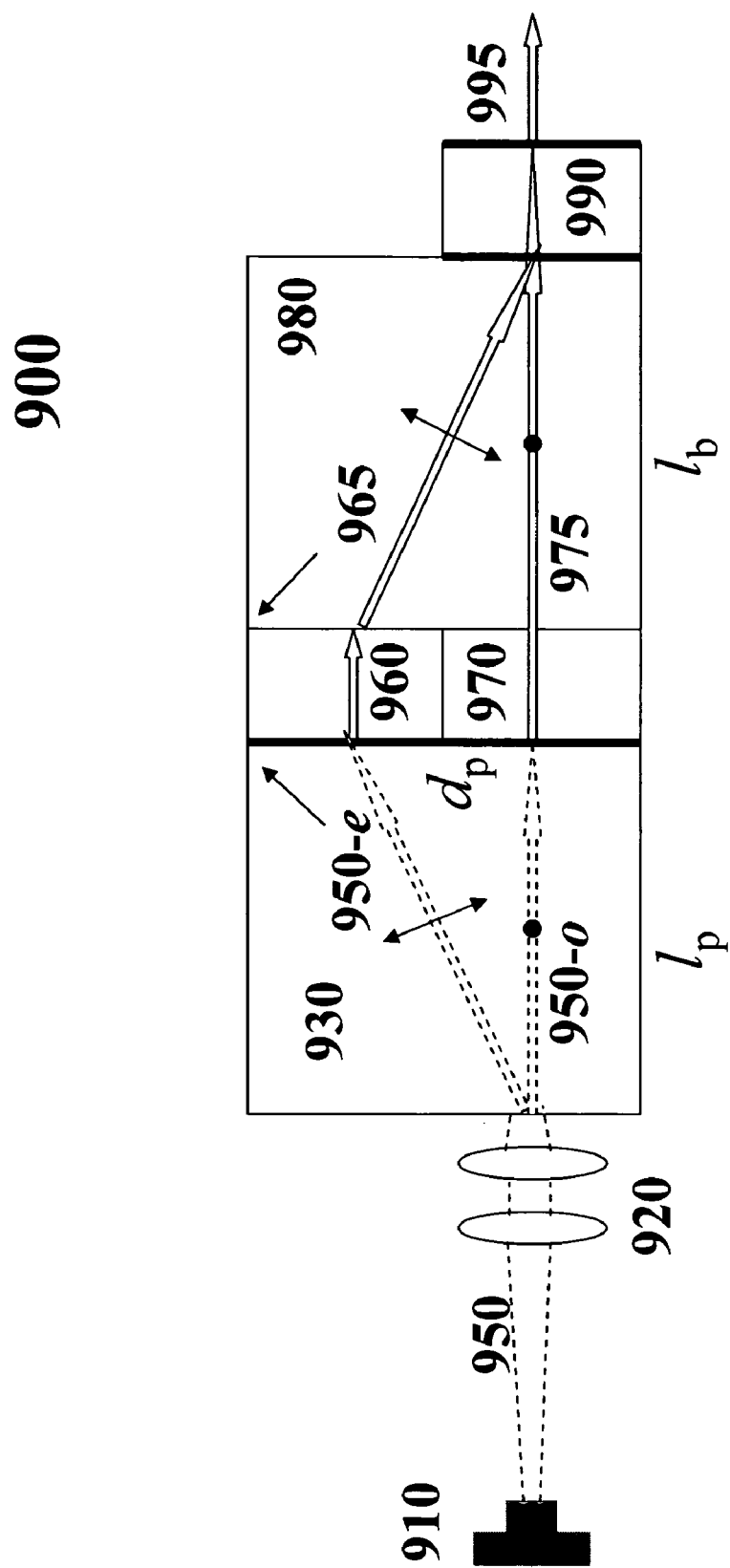
FIG. 9A shows a preferred embodiment of the inventive monolithic microchip laser, in which a birefringent crystal is integrated for splitting one pump beam into two components of orthogonal polarizations.

For illustration, a preferred embodiment is hereby displayed in FIG. 9A. A laser diode 910 emits a pump beam 950, which passes through the beam shaping optics 920 for collimation and enters a birefringent crystal 930. In accordance with our inventive teachings, the pump beam 950 is linearly polarized with a predefined direction. Due to the walk-off effect, it is split into two components in the birefringent crystal 930. The component 950-$e$, which is polarized along the principal plane of 930, is an e-ray and its propagation direction tilts upwards by the walk-off angle. Another component, 950-$o$, whose polarization is normal to the principal plane of 930, is an o-ray and, therefore, remains its propagation direction. These two components are then directed into their corresponding gain media 960 and 970 as pump sources. With this configuration, a single laser diode can be employed for simultaneously pumping two gain media. According to our inventive teachings, the gain media 960 and 970 are so oriented that their preferable absorption directions match the polarizations of the pump beams directed to them. The intensity ratio of the beam component 950-$e$ to the component 950-$o$ is determined by the polarization state of 950. By adjusting the polarization direction of beam 950, the efficiencies for pump and frequency mixing can be optimized. This process can be accomplished by rotating the pump source, which in this FIG. 9A, is a free-space diode.

Since $d_p$, the separation of the points, where the pump beams 950-$e$ and 950-$o$ enter their gain media 960 and 970, is determined by the length of the birefringent crystal 930, $l_p$, and the characteristics thereof, and is generally small, the required length, $l_b$, for the beam combing birefringent crystal 980 is short, which minimizes intracavity optical loss and makes the structure very compact. If the birefringent crystals 930 and 980 are of same type, their optic axes are mutually orthogonal. If one crystal is positive while the other is negative, their optic axes should be parallel to each other.

Figure 9B:
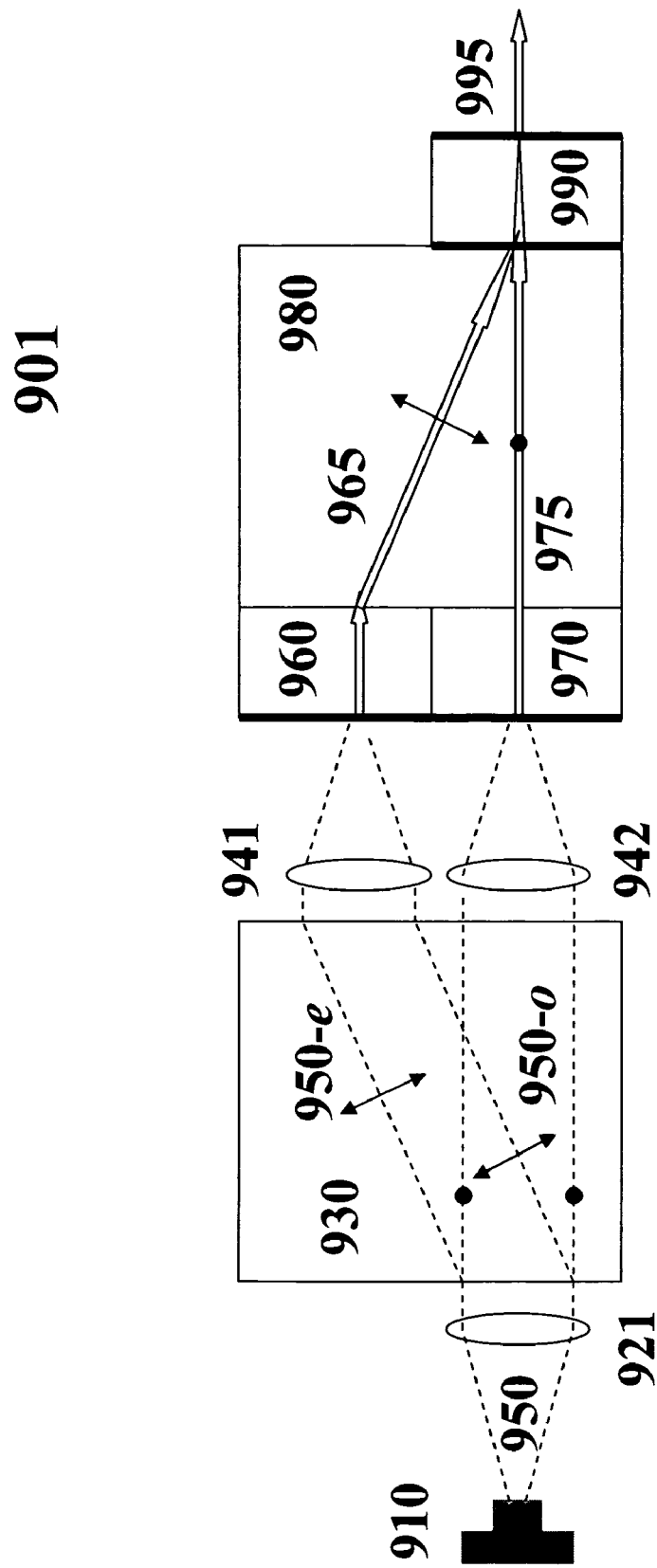
FIG. 9B shows an alternative embodiment of the inventive monolithic microchip laser, in which a birefringent crystal is integrated for splitting one pump beam into two components of orthogonal polarizations.

An alternative embodiment of the compact pump source is shown in FIG. 9B. Instead of physical contact with the gain media 960 and 970 as shown in FIG. 9A, the birefringent crystal 930 is now a separated element and is optically connected to the gain media through focus lenses 941 and 942. This embodiment is differentiated from the one shown in FIG. 9A also in respect of the beam sizes passing through the birefringent crystal 930. In this alternative embodiment, the beam 950 is expanded after passing through the telescope 921. As a consequence, the split beams 950-$e$ and 950-$o$ are both wide collimated in 930. This embodiment allows implementation of high pump powers.

Figure 9C:
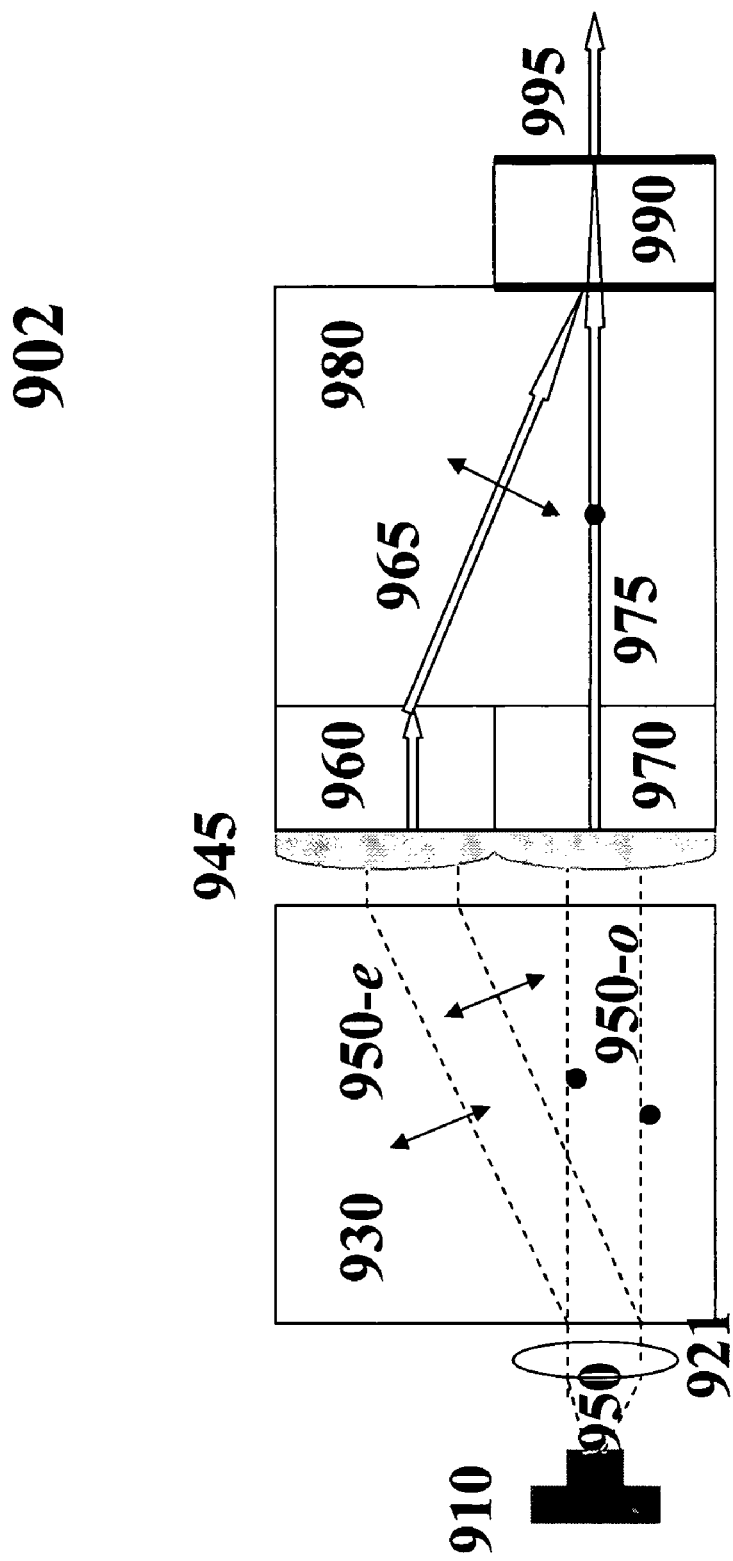
FIG. 9C shows another alternative embodiment of the inventive monolithic microchip laser, in which a birefringent crystal is integrated for splitting one pump beam into two components of orthogonal polarizations.

Alternatively, the focus lenses 941 and 942 can be replaced with microlens arrays. Microlens arrays including GRIN (gradient index) lens arrays can be fabricated by processing lithography and etching on proper films deposited on substrates, which, in the configuration of FIG. 9C, are the gain media 960 and 970. In this FIG. 9C, the microlens array 945 is utilized as the beam focus element, which results in a compact pump unit.

Figure 9D:
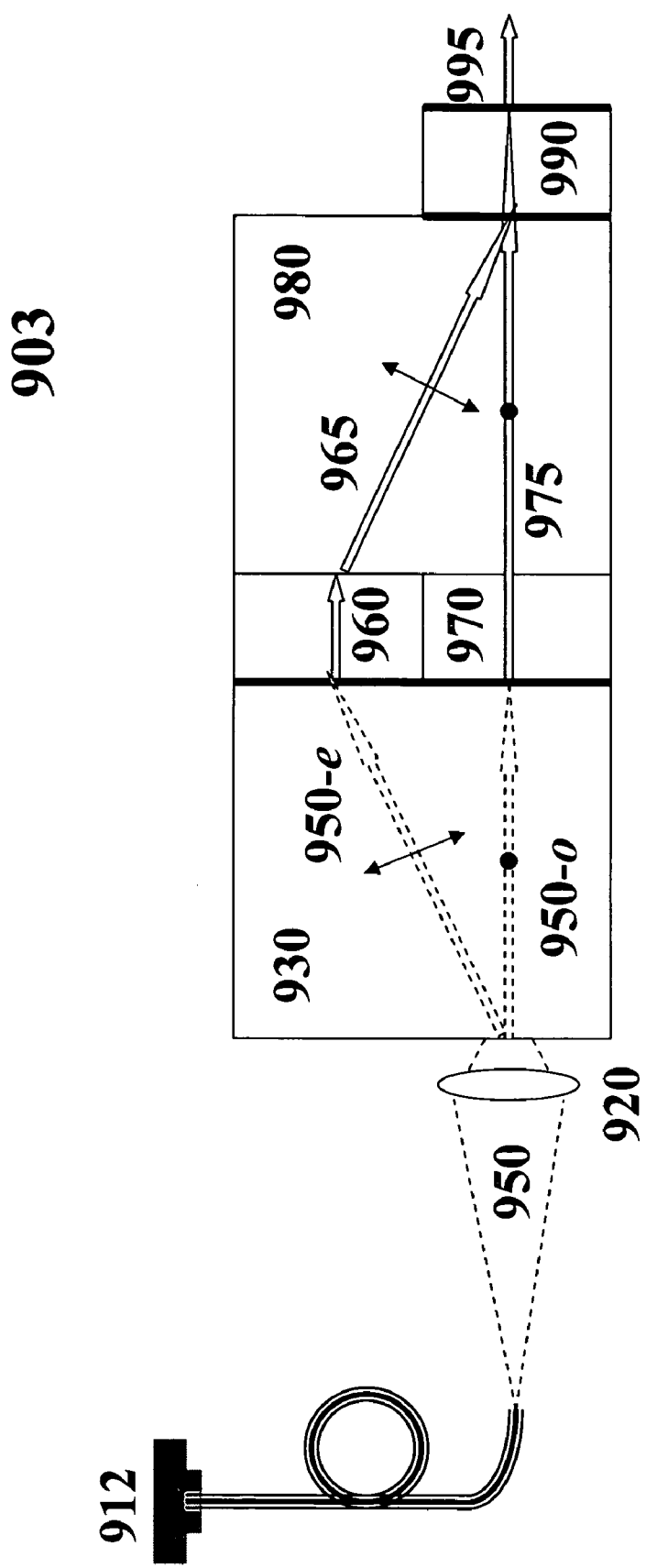
FIG. 9D shows yet another alternative embodiment of the inventive monolithic microchip laser, in which a birefringent crystal is integrated for splitting one pump beam into two components of orthogonal polarizations.

FIG. 9D shows another alternative embodiment of the compact pump source. In particular, the free-space laser diode 910 is replaced by a fiber-coupled emitter 912. Polarization is randomized through the fiber, which results in two pump components 950-$o$ and 950-$e$ of equivalent intensities. This embodiment is especially useful for SFM or DFM requiring two identical pump intensities for optimized performance such as those when two fundamental beams are generated from same type of gain media for producing identical wavelengths.

The pump beam splitting scheme illustrated in FIGS. 9A-9D can also be utilized for simultaneously injecting pump energy into two separate active regions of an isotropic gain medium or a gain medium characteristic of polarization-dependent lasing transition in order to generate two fundamental beams. For these applications, the isotropic gain medium or the gain medium characteristic of polarization-dependent lasing transition is sandwiched in between two birefringent crystals: one for pump beam splitting, while the other for polarization discrimination and fundamental beam combination. This enables compact and low-cost monolithic microchip lasers. Furthermore, high-volume fabrication can be made by adding the birefringent crystal 930, as a layer, onto the structure illustrated in FIG. 2D.

TABLE 1A

| Lasing Medium | Fundamental $\lambda_1$ (nm) | Fundamental $\lambda_2$ (nm) | Sum Frequency $\lambda_3$ (nm) | Dif Frequency $\lambda_4$ (nm) |
|---|---|---|---|---|
| Nd:YVO$_4$ | 1342.0 | 1342.0 | 671.0 | |
| | 1064.3 | 1342.0 | 593.6 | 5143.3 |

TABLE 1A-continued

| Lasing Medium | Fundamental $\lambda_1$ (nm) | Fundamental $\lambda_2$ (nm) | Sum Frequency $\lambda_3$ (nm) | Dif Frequency $\lambda_4$ (nm) |
|---|---|---|---|---|
| | 1064.3 | 1064.3 | 532.2 | |
| | 1064.3 | 914.0 | 491.7 | 6472.2 |
| | 1342.0 | 914.0 | 543.7 | 2865.9 |
| | 914.0 | 914.0 | 457.0 | |
| Nd:GdVO$_4$ | 1341.3 | 1341.3 | 670.7 | |
| | 1063.1 | 1341.3 | 593.1 | 5125.6 |
| | 1063.1 | 1063.1 | 531.6 | |
| | 1063.1 | 912.6 | 491.1 | 6446.4 |
| | 1341.3 | 912.6 | 543.1 | 2855.3 |
| | 912.6 | 912.6 | 456.3 | |
| Nd:KG(WO$_4$)$_2$ | 1351.0 | 1351.0 | 675.5 | |
| | 1067.0 | 1351.0 | 596.2 | 5075.8 |
| | 1067.0 | 1067.0 | 533.5 | |
| | 1067.0 | 911.0 | 491.4 | 6231.0 |
| | 1351.0 | 911.0 | 544.1 | 2797.2 |
| | 911.0 | 911.0 | 455.5 | |

TABLE 1B

| Lasing Medium | Fundamental $\lambda_1$ (nm) | Fundamental $\lambda_2$ (nm) | Sum Frequency $\lambda_3$ (nm) | Dif Frequency $\lambda_4$ (nm) |
|---|---|---|---|---|
| Nd:YAG | 1318.8 | 1318.8 | 659.4 | |
| | 1064.2 | 1318.8 | 588.9 | 5512.4 |
| | 1064.2 | 1064.2 | 532.1 | |
| | 1064.2 | 946 | 500.8 | 8517.2 |
| | 1318.2 | 946 | 550.8 | 3350.4 |
| | 946 | 946 | 473.0 | |
| Nd:YLF | 1321 | 1321 | 660.5 | |
| | 1321 | 1313 | 658.5 | |
| | 1321 | 1053 | 585.9 | 5190.3 |
| | 1321 | 1047 | 584.1 | 5047.8 |
| | 1313 | 1313 | 656.5 | |
| | 1313 | 1053 | 584.4 | 5317.7 |
| | 1313 | 1047 | 582.5 | 5168.1 |
| | 1053 | 1053 | 526.5 | |
| | 1053 | 1047 | 525.0 | |
| | 1047 | 1047 | 523.5 | |

TABLE 1C

| Lasing Medium | Fundamental $\lambda_1$ (nm) | Fundamental $\lambda_2$ (nm) | Sum Frequency $\lambda_3$ (nm) |
|---|---|---|---|
| Yb:YVO$_4$ | 1010.0 | 1010.0 | 505.0 |
| Yb:KGW | 1023.0 | 1023.0 | 511.5 |
| Yb:KYW | 1025.0 | 1025.0 | 512.5 |
| Yb:YAG | 1030.0 | 1030.0 | 515.0 |
| | 1030.0 | 1050.0 | 520.0 |
| | 1050.0 | 1050.0 | 525.0 |

What is claimed is:

1. A monolithic microchip laser that produces low-noise blue light comprising: a birefringent crystal, selected from the group including TiO$_2$, un-doped YVO$_4$, and other crystals in which the refractive indexes for the e-ray and o-ray are substantially different; a first gain medium which is an a-cut neodymium doped crystal anisotropic in respect of emission polarization and end-pumped by a first pump light to generate the first fundamental wave based on the polarized laser transition $^4F_{3/2} \rightarrow ^4I_{9/2}$; a second gain medium which is an a-cut neodymium doped crystal anisotropic in respect of emission polarization and end-pumped by a second pump light to generate the second fundamental wave based on the polarized laser transition $^4F_{3/2} \rightarrow ^4I_{11/2}$; and a nonlinear optical crystal in which the two fundamental waves are collinearly combined and intracavity sum frequency mixing of the first and second fundamental wavelengths takes place; wherein: the birefringent crystal is cut in such a way that the angle between its optic axis and the normal to the crystal surface, is $\pi/4$ or $3\pi/4$; the birefringent crystal is sandwiched in between the two gain media and the nonlinear optical crystal with optical bonding at the interfaces; the two gain media are optically bonded to each other and are oriented with mutually orthogonal optic axes (C-axis), whereby one fundamental wave is an e-ray in the birefringent crystal and the other is an o-ray; the exterior surface of the first gain medium, where the first pump beam enters, is coated highly reflective to the first fundamental wavelength, anti-reflective to the first pump wavelength, and highly transmissive to the wavelengths corresponding to the laser transitions $^4F_{3/2} \rightarrow ^4I_{11/2}$ and $^4F_{3/2} \rightarrow ^4I_{13/2}$; the exterior surface of the second gain medium, where the second pump beam enters, is coated highly reflective to the second fundamental wavelength and is anti-reflective to the second pump wavelength; the interface between the birefringent crystal and the nonlinear optical crystal is coated highly transmissive to the first and second fundamental wavelengths and is highly reflective to the blue wavelength generated from the sum frequency mixing in the nonlinear optical crystal; the exterior surface of the nonlinear optical crystal is a mirror common to the first and second resonant cavities, it is highly reflective to at least one of the fundamental wavelengths and is highly transmissive to the blue generated from the sum frequency mixing in the nonlinear optical crystal; the two pump lights are split from a single light source and are substantially parallel to each other and are separated by a distance equal to the birefringent crystal length multiplied by the tangent walk-off angle; the intensity ratio of the first and second pump lights is greater than one.

2. A monolithic microchip laser as of claim 1, wherein:
the first gain medium is Nd:YVO$_4$ and the first fundamental wavelength is 914 nm;
the second gain medium is Nd:YVO$_4$ and the second fundamental wavelength is 1064 nm; and
the laser output wavelength is 492 nm.

3. A monolithic microchip laser as of claim 1, wherein:
the first gain medium is Nd:GdVO$_4$ and the first fundamental wavelength is 913 nm;
the second gain medium is Nd:GdVO$_4$ and the second fundamental wavelength is 1063 nm; and
the laser output wavelength is 491 nm.

4. A monolithic microchip laser as of claim 1, wherein:
the first gain medium is Nd:KG(WO$_4$)$_2$ and the first fundamental wavelength is 911 nm;
the second gain medium is Nd:KG(WO$_4$)$_2$ and the second fundamental wavelength is 1067 nm; and
the laser output wavelength is 491 nm.

5. A monolithic microchip laser that produces low-noise visible light comprising:
a birefringent crystal, selected from the group including TiO$_2$, un-doped YVO4, and other crystals in which the refractive indexes for the e-ray and o-ray are substantially different;
a gain medium end pumped by two parallel pump lights that are separated by a distance equal to the birefringent crystal length multiplied by the tangent walk-off angle; and
a nonlinear optical crystal;
wherein:
the two pump lights are split from a single laser source;
the birefringent crystal is cut in such a way that the angle between its optic axis and the normal to the crystal surface, is $\pi/4$ or $3\pi/4$;

the birefringent crystal is sandwiched in between the gain medium and the nonlinear optical crystal, all the crystals are optically bonded to each other;

the two pump lights simultaneously activate two separate regions of the gain medium by populating, the energy level $^4F_{3/2}$;

in the first activated region extraordinary (π) transition with polarization parallel to the principal plane of the birefringent crystal is supported, upon interaction with the first resonant cavity composed of a first mirror which is a dielectric coating on the exterior surface of the gain medium where the first pump light enters and a second mirror which is a dielectric coating on the exterior surface of the nonlinear optical crystal, the first fundamental wavelength is generated;

the first resonant cavity consists of three segments representing the three optical paths, respectively in the first activated region of the gain medium, in the birefringent crystal, and in the nonlinear optical crystal, wherein the two end segments are parallel and are connected by the middle segment with an angle equivalent to the walk-off angle;

in the second activated region ordinary transition (σ) with polarization normal to the principal plane of the birefringent crystal is supported, upon interaction with the second resonant cavity, which is geometrically linear and is composed of a first mirror which is a dielectric coating on the exterior surface of the gain medium where the second pump light enters and a second mirror which is a dielectric coating on the exterior surface of the nonlinear optical crystal, the second fundamental wavelength is generated;

the two fundamental waves are collinearly combined in the nonlinear optical crystal, in which intracavity sum frequency mixing of the first and second fundamental wavelengths takes place;

the second mirror of the first resonant cavity and the second mirror of the second resonant cavity are common, with high reflectance to the two fundamental wavelengths and high transmittance to the visible wavelength generated by the intracavity sum frequency mixing;

the first mirror of the first resonant cavity is coated highly reflective to the first fundamental wavelength with π polarization and anti-reflective to the first pump wavelength;

the first mirror of the second resonant cavity is coated highly reflective to the second fundamental wavelength with σ polarization and anti-reflective to the second pump wavelength;

the interface between the birefringent crystal and the nonlinear optical crystal is coated highly transmissive to the first and second fundamental wavelengths and is highly reflective to the wavelength generated from the sum frequency mixing in the nonlinear optical crystal.

6. A monolithic microchip laser as of claim 5, wherein:
the gain medium is Nd:YLF;
the first fundamental wavelength is 1047 nm;
the second fundamental wavelength is 1053 nm; and
the laser output wavelength is 525 nm.

7. A monolithic microchip laser as of claim 5, wherein:
the gain medium is Nd:YLF;
the first fundamental wavelength is 1047 nm;
the second fundamental wavelength is 1313 nm; and
the laser output wavelength is 583 nm.

8. A monolithic microchip laser as of claim 5, wherein:
the gain medium is Nd:YLF;
the first fundamental wavelength is 1321 nm;
the second fundamental wavelength is 1053 nm; and
the laser output wavelength is 586 nm.

9. A monolithic microchip laser as of claim 5, wherein:
the gain medium is Nd:YLF:
the first fundamental wavelength is 1321 nm;
the second fundamental wavelength is 1313 nm; and
the laser output wavelength is 659 nm.

10. A monolithic microchip laser that produces low-noise visible light comprising:

a birefringent crystal, selected from the group including $TiO_2$, un-doped $YVO_4$, and other crystals in which the refractive indexes for the e-ray and o-ray are substantially different;

a gain medium isotropic in respect of emission polarization; and a nonlinear optical crystal;

wherein:

the birefringent crystal is cut in such a way that the angle between its optic axis and the normal to the crystal surface, is π/4 or 3π/4;

the birefringent crystal is sandwiched in between the gain medium and the nonlinear optical crystal, all the crystals are optically bonded to each other;

the gain medium is end pumped by two parallel pump lights to simultaneously activate two separate regions of the gain medium by populating the energy level $^4F_{3/2}$;

the two pump lights are split from a single laser source and are separated by a distance equal to the birefringent crystal length multiplied by the tangent walk-off angle;

upon interaction with the first resonant cavity composed of a first mirror which is a dielectric coating on the, exterior surface of the gain medium where the first pump light enters and a second mirror which is a dielectric coating on the exterior surface of the nonlinear optical crystal, the first fundamental wavelength is generated, the first fundamental wave is an e-ray in the birefringent crystal;

the first resonant cavity consists of three segments representing the three optical paths respectively, in the first activated region of the gain medium, in the birefringent crystal and in the nonlinear optical crystal wherein the two end segments are parallel and are connected by the middle segment with an angle equivalent to the walk-off angle;

upon interaction with the second resonant cavity, which is geometrically linear and is composed of a first mirror which is a dielectric coating on the exterior surface of the grain medium where the second pump light enters and a second mirror which is a dielectric coating on the exterior surface of the nonlinear optical crystal, the second fundamental wavelength is generated, the second fundamental wave is an o-ray in the birefringent crystal;

the two fundamental waves are collinearly combined in the nonlinear optical crystal, in which intracavity sum frequency mixing of the first and second fundamental wavelengths takes place;

the second mirror of the first resonant cavity and the second mirror of the second resonant cavity are common, with high reflectance to the two fundamental wavelengths and high transmittance to the wavelength generated by the intracavity sum frequency mixing;

the first mirror of the first resonant cavity is coated highly reflective to the wavelength and polarization of the first fundamental wave and anti-reflective to the first pump wavelength;

the first mirror of the second resonant cavity is coated highly reflective to the wavelength and polarization of the second fundamental wave and anti-reflective to the second pump wavelength;

the interface between the birefringent crystal and the non-linear optical crystal is coated highly transmissive to the first and second fundamental wavelengths and is highly reflective to the wavelength generated from the sum frequency mixing in the nonlinear optical crystal.

11. A monolithic microchip laser as of claim 10, wherein:
the gain medium is Nd:YAG;
the first fundamental wavelength is 946 nm;
the second fundamental wavelength is 1064 nm; and
the laser output wavelength is 501 nm.

12. A monolithic microchip laser as of claim 10, wherein:
the gain medium is Nd:YAG;
the first fundamental wavelength is 1319 nm;
the second fundamental wavelength is 1064 nm; and
the laser output wavelength is 589 nm.

13. A monolithic microchip laser as of claim 10, wherein:
the gain medium is Nd:YAG;
the first fundamental wavelength is 946 nm;
the second fundamental wavelength is 1319 nm; and
the laser output wavelength is 551 nm.

14. A monolithic microchip laser as of 10, wherein:
the gain medium is Nd:YAG;
the first fundamental wavelength is 1064 nm;
the second fundamental wavelength is 1064 nm; and
the laser output wavelength is 532 nm.

15. A monolithic microchip laser as of claim 10, wherein:
the gain medium is Nd:YAG;
the first fundamental wavelength is 946 nm;
the second fundamental wavelength is 946 nm; and
the laser output wavelength is 473 nm.

* * * * *